United States Patent [19]
Hosoya et al.

[11] Patent Number: 5,566,547
[45] Date of Patent: Oct. 22, 1996

[54] CONTROLLING APPARATUS FOR INTRODUCING AIR INTO AN EXHAUST PIPE OF AN INTERNAL COMBUSTION ENGINE

[75] Inventors: Yasuhiko Hosoya; Toshiki Kuroda; Hideaki Katashiba, all of Hyogo, Japan

[73] Assignee: Mitsubishi Denki Kabushiki Kaisha, Tokyo, Japan

[21] Appl. No.: 463,634

[22] Filed: Jun. 6, 1995

Related U.S. Application Data

[62] Division of Ser. No. 78,465, Jun. 18, 1993.

[30] Foreign Application Priority Data

Jun. 23, 1992 [JP] Japan .................................. 4-164811

[51] Int. Cl.$^6$ ....................................................... F01N 3/30
[52] U.S. Cl. ............................ 60/284; 60/289; 60/300
[58] Field of Search ........................... 60/284, 300, 274, 60/289

[56] References Cited

U.S. PATENT DOCUMENTS

| | | | |
|---|---|---|---|
| 3,503,716 | 3/1970 | Berger | 60/286 |
| 3,751,914 | 8/1973 | Pollock | 60/284 |
| 3,962,867 | 6/1976 | Ikeura et al. | 60/290 |
| 4,098,078 | 7/1978 | Laurent | 60/290 |

FOREIGN PATENT DOCUMENTS

| | | |
|---|---|---|
| 2450946 | 3/1979 | France . |
| 1088764 | 9/1960 | Germany . |
| 2306471 | 2/1973 | Germany . |
| 2336600 | 7/1973 | Germany . |
| 4106249 | 2/1991 | Germany . |
| 4127596 | 8/1991 | Germany . |
| 4139291 | 11/1991 | Germany . |
| 47-33956 | 11/1972 | Japan . |
| 52-110320 | 9/1977 | Japan . |
| 56-60813 | 5/1981 | Japan . |
| 57-46010 | 3/1982 | Japan .................................. 60/284 |

*Primary Examiner*—Douglas Hart
*Attorney, Agent, or Firm*—Sughrue, Mion, Zinn, Macpeak & Seas

[57] ABSTRACT

In an apparatus for controlling the introduction of air into an exhaust pipe of an internal combustion engine in which air is introduced from the intake side to the exhaust side to improve the efficiency of purifying exhaust gases, to prevent a decline in the purification efficiency of a catalyst in a state in which the exhaust gas temperature immediately after starting is low. A control valve 11 is provided in an air introducing pipe 9 for introducing air from the intake side to the exhaust side, and the control valve 11 is set in a shut-off state during starting or during starting and a predetermined time duration immediately after starting.

3 Claims, 34 Drawing Sheets

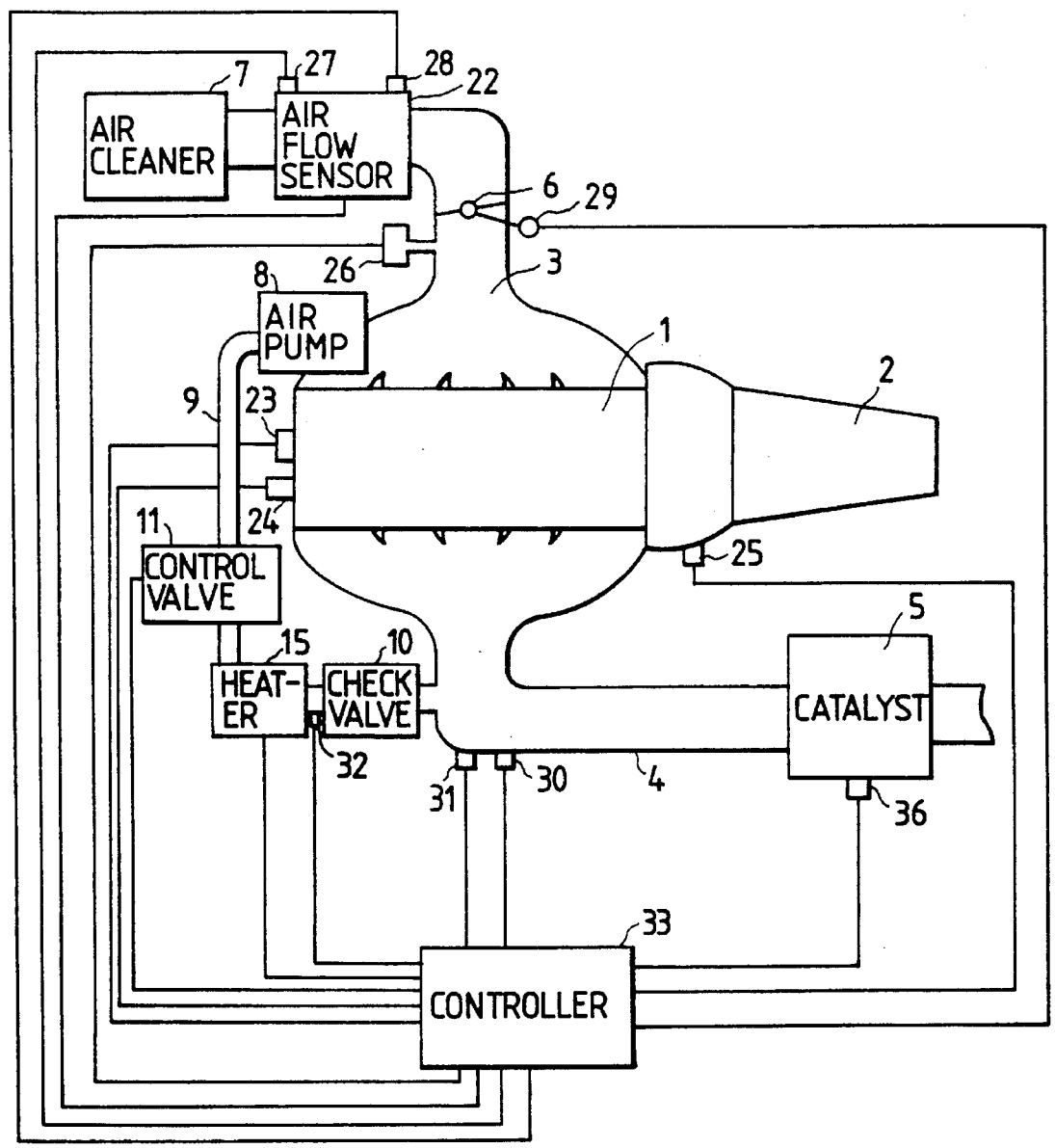

FIG. 35
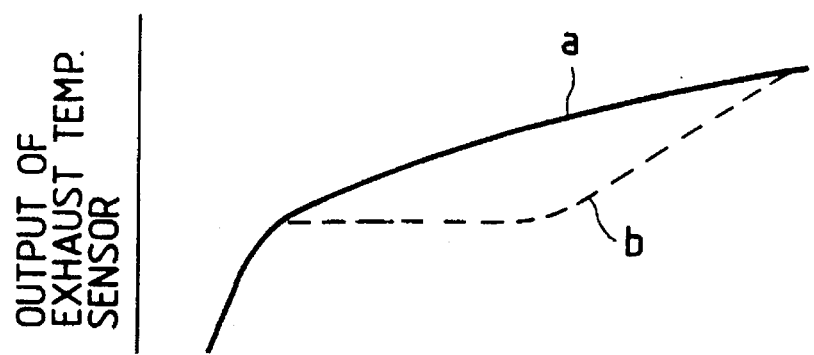
(a)
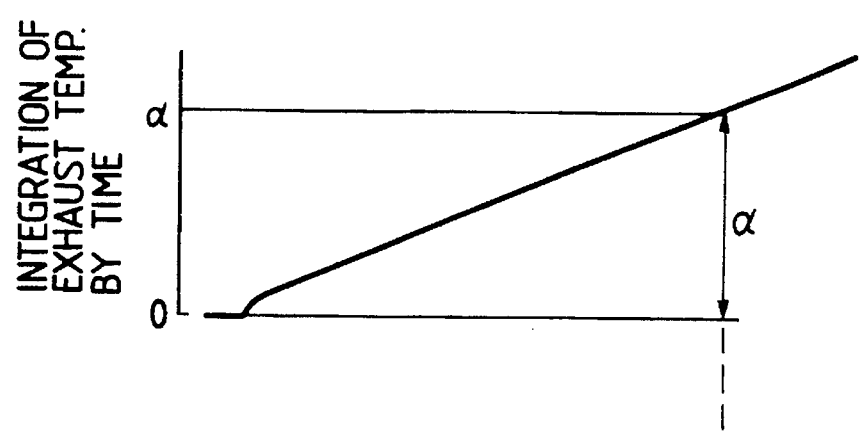
(b)
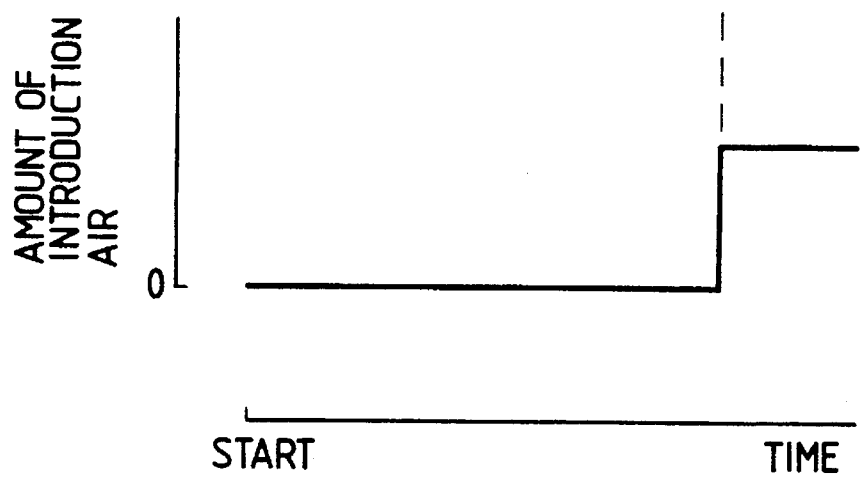
(c)

CONTROLLING APPARATUS FOR INTRODUCING AIR INTO AN EXHAUST PIPE OF AN INTERNAL COMBUSTION ENGINE

This is a divisional application of U.S. application Ser. No. 08/078,465 filed Jun. 18, 1993.

BACKGROUND OF THE INVENTION

This invention relates to an apparatus for controlling the introduction of air into an exhaust pipe, for introducing air into an exhaust pipe of an internal combustion engine so as to purify exhaust gases. A catalyst is generally provided in an exhaust passage so as to purify exhaust gases from an internal combustion engine. Immediately after the starting of an internal combustion engine in which the catalyst temperature is low and purification efficiency is low, it has been the conventional practice to introduce air into an exhaust pipe upstream of the catalyst so as to promote the oxidation of HC, CO and the like in the catalyst, thereby accelerating the temperature rise of the catalyst and enhancing the purification efficiency.

FIG. 46 shows a configuration of a conventional apparatus for controlling the introduction of air into an exhaust pipe of an internal combustion engine, in which reference numeral 1 denotes an internal combustion engine; 2, a transmission; 3, an intake pipe; 4, an exhaust pipe; 5, a catalyst disposed in the exhaust pipe 4; 6, a throttle valve disposed in the intake pipe 3; 7, an air cleaner disposed in an inlet portion of the intake pipe 3; 8, an air pump mounted on the internal combustion engine 1; 9, an air introducing pipe for introducing air to the exhaust pipe 4 upstream of the catalyst 5 by means of the air pump 8; and 10, a check valve disposed in the air introducing pipe 9 for preventing the reverse flow of exhaust gases from the exhaust pipe 4.

Next, a description will be given of the operation of the conventional apparatus. The air pump 8 introduces air into the exhaust pipe 4 via the air introducing pipe 9 in correspondence with the rotation of the internal combustion engine 1, and the air introduced to the interior of the exhaust pipe 4 reacts with exhaust gas components CO and HC in the exhaust pipe 4 and in the catalyst 5 and converts the same into $H_2O$ and $CO_2$, thereby effecting the purification of the exhaust gases. The introduction of air into the exhaust pipe 4 is started simultaneously with the on operation of an unillustrated starter switch, as shown in FIG. 47. The amount of air introduced at this time is substantially fixed in terms of time, as shown in FIG. 48, and the temperature of the introduced air is that of the atmospheric air.

FIG. 49 shows a configuration of another conventional apparatus, in which reference numeral 11 denotes a control valve disposed in the air introducing pipe 9 for adjusting the amount of air to be introduced; 15, a heater for heating the air passing through the air introducing pipe 9; 16, a relief valve attached to the control valve 11; and 12, a controller for controlling the control valve 11 and the heater 15. The other configuration is the same as that of FIG. 46.

Next, a description will be given of the operation of the conventional apparatus shown in FIG. 49. At the same time as an unillustrated key switch is turned on, the control valve 11 opens the passage by being controlled by the controller 12. While the internal combustion engine is cranking (when the starter switch is turned on), the air pump 8 is driven by the internal combustion engine 1 and introduces the air into the exhaust pipe 4 via the air introducing pipe 9, the control valve 11, the heater 15, and the check valve 10. The air introduced into the exhaust pipe 4 reacts with the exhaust gas components HC and CO in the exhaust pipe 4 and the catalyst 5, thereby effecting the purification of the exhaust gases. FIG. 50 shows a chart of operation at this time, in which the starter switch is also turned on simultaneously as the key switch is turned on, the internal combustion engine 1 also starts to rotate simultaneously therewith and drives the air pump 8, thereby introducing an amount of air corresponding to its number of revolutions into the exhaust pipe 4. At this time, the air is heated by the heater 15, and the temperature of the air at the outlet of the heater 15 changes with time, as shown in FIG. 51.

In addition, FIG. 52 shows still another conventional apparatus, in which reference numeral 8a denotes an air pump of an electrically controlled type disposed in the air introducing pipe 9; and 22, an air flow sensor for measuring the amount of air intake. The operation is similar to that of the above-described conventional apparatuses.

FIG. 53 shows a configuration of a further conventional apparatus, in which reference numeral 46 denotes an air-fuel ratio sensor disposed in the exhaust pipe 4 for detecting the air-fuel ratio of the exhaust gases, and the other configuration is the same as described above. Although the operation is similar to that described above, the air-fuel ratio sensor 46 detects the air-fuel ratio of an air-fuel mixture of the introduced air and the exhaust gases at the time of the introduction of the air, and is capable of controlling the air-fuel ratio on the basis of it.

The conventional apparatuses for controlling the introduction of air into an exhaust pipe of an internal combustion engine are arranged as described above, and the normal-temperature air is introduced into the exhaust pipe 4 immediately after starting when the exhaust gas temperature is low, so that there has been a problem in that the temperature of the exhaust gases is further lowered by the introduced air, thereby resulting in a decline in the efficiency of purifying the exhaust gases in the catalyst 5.

In addition, since the air is introduced into the exhaust pipe 4 simultaneously as the starter switch is turned on, the air passes through the interior of the heater 15 before the heater 15 reaches a predetermined temperature, and the speed of temperature rise of the heater 15 is delayed. Hence, there has been a problem in that the efficiency of purifying the exhaust gases in the catalyst 5 declines.

Furthermore, the amount of air introduced is constant irrespective of the operating condition of the engine and the type and condition of the catalyst 5, so that there has been a problem in that an optimum purification efficiency cannot be attained.

In addition, since the high temperature of the exhaust gases from the exhaust pipe 4 acts on the check valve 10, the heater 15, and the control valve 11 disposed in the air introducing pipe 9, it is difficult for these members to operate properly for long periods of time, which in the long run resulted in the decline in the purification efficiency.

With the conventional apparatuses, the introduction of air is commenced simultaneously with starting and, as shown in FIG. 54, the introduction of the air into the exhaust pipe 4 is continued even after the passing of a point of time (point A) when the catalyst inlet temperature (solid line) and the catalyst outlet temperature (dotted line) in the exhaust pipe 4 agree with each other. As a result, the temperature rise of the catalyst 5 becomes saturated, so that a further improvement in the efficiency of purification by the catalyst 5 is hampered. At the same time, the condition becomes one in which oxygen is in a state of oversupply, and the action of reducing nitrogen oxides by means of the catalyst 5 declines, so that there has been a problem in that the amount of nitrogen oxides emitted increases.

In addition, since the air is introduced to the upstream side of the air-fuel ratio sensor 46, there has been a problem in that the air-fuel ratio of the exhaust gases alone cannot be detected accurately, thereby making it impossible to effect fuel control accurately.

SUMMARY OF THE INVENTION

This invention has been effected to overcome the above-described problems, and its object is to obtain an apparatus for controlling the introduction of air into an exhaust pipe of an internal combustion engine, which is capable of enhancing the efficiency of the exhaust gas purification reaction in the exhaust pipe and the catalyst, of reducing the amount of nitrogen oxides emitted, and of accurately conducting fuel control.

The apparatus for controlling the introduction of air into an exhaust pipe of an internal combustion engine in accordance with this invention comprises: means for sending air to the exhaust side via an air introducing pipe; and controlling means for stopping the introduction of the air to the exhaust side during the starting of the internal combustion engine or during starting and a predetermined time duration after starting.

In addition, the apparatus for controlling the introduction of air into an exhaust pipe of an internal combustion engine comprises: heating means for heating the air introduced into the air introducing pipe; and controlling means for stopping the introduction of the heated air to an exhaust side during starting or during a predetermined time duration after starting.

In addition, the apparatus for controlling the introduction of air into an exhaust pipe of an internal combustion engine comprises: heating means for heating the air introduced into the air introducing pipe; and controlling means for starting the introduction of the heated air into the exhaust pipe after a predetermined time duration subsequent to the starting of the engine and for varying the amount of the air introduced at a predetermined time interval.

In addition, the apparatus for controlling the introduction of air into an exhaust pipe of an internal combustion engine comprises: heating means disposed between the catalyst in the exhaust pipe and a connecting portion of the air introducing pipe so as to heat exhaust gases and the air introduced from the intake side.

In the apparatus for controlling the introduction of air into an exhaust pipe of an internal combustion engine, the heating means in the exhaust pipe is operated for a predetermined time duration even after the stopping of the engine.

The apparatus for controlling the introduction of air into an exhaust pipe of an internal combustion engine comprises: heating means for heating the air introduced into the air introducing pipe; and controlling means for varying the amount of air introduced into the exhaust pipe at a predetermined time interval.

In the apparatus for controlling the introduction of air into an exhaust pipe of an internal combustion engine, at least one of a time interval at which the air introduced into the exhaust pipe is varied, the amount of variation, and the amount of heating by the heating means is varied in accordance with an operational parameter of the engine.

The apparatus for controlling the introduction of air into an exhaust pipe of an internal combustion engine comprises: air heating means for heating the air introduced into the air introducing pipe; catalyst heating means for heating the catalyst; and controlling means for varying the amount of air introduced into the exhaust pipe at a predetermined time interval.

The apparatus for controlling the introduction of air into an exhaust pipe of an internal combustion engine further comprises: an exhaust-gas temperature sensor for detecting the temperature of exhaust gases and a catalyst temperature sensor for detecting the temperature of the catalyst and controlling means for controlling the amount of air heated and the time interval of variation thereof in accordance with one of the exhaust gas temperature and the catalyst temperature.

In the apparatus for controlling the introduction of air into an exhaust pipe of an internal combustion engine, at least one of a time interval at which the amount of air introduced is varied, the amount of variation, the amount of air heated, and the amount of catalyst heated is varied in accordance with an operational parameter of the engine.

The apparatus for controlling the introduction of air into an exhaust pipe of an internal combustion engine comprises: controlling means for starting the introduction of the air into the exhaust pipe after a predetermined time duration subsequent to the starting of the engine and for varying the amount of the air introduced at a predetermined time interval.

The apparatus for controlling the introduction of air into an exhaust pipe of an internal combustion engine comprises: an exhaust bypass passage disposed in a portion of the exhaust pipe upstream of a catalyst; means for introducing air into the exhaust bypass passage via an air introducing pipe; means for heating the introduced air; a changeover valve for changing over the flow of exhaust gases between the exhaust pipe and the exhaust bypass passage; and controlling means for changing over the changeover valve in such a manner that the exhaust gases flow to the exhaust pipe before a predetermined time duration prior to the stopping of the introduction of air.

In the apparatus for controlling the introduction of air into an exhaust pipe of an internal combustion engine, the introduction of air is started after a predetermined time duration subsequent to the starting of the engine.

The apparatus for controlling the introduction of air into an exhaust pipe of an internal combustion engine comprises: means for detecting a heat capacity imparted to the catalyst by the exhaust gases; and means for starting the introduction of air to the exhaust side when the heat capacity reaches a predetermined value.

The apparatus for controlling the introduction of air into an exhaust pipe of an internal combustion engine comprises: exhaust-gas temperature sensors for detecting the exhaust gas temperature at an inlet and an outlet of the catalyst; and means for stopping the introduction of air into the exhaust pipe when the inlet temperature and the outlet temperature of the catalyst have agreed with each other or when the temperature difference has become a predetermined value or less.

The apparatus for controlling the introduction of air into an exhaust pipe of an internal combustion engine comprises: an air-fuel ratio sensor disposed in the exhaust pipe upstream of a connecting portion of the air introducing pipe so as to detect an air-fuel ratio of exhaust gases; an oxygen sensor for detecting an oxygen concentration in the exhaust pipe;

and controlling means for effecting fuel control and control of the amount of air introduced in accordance with the outputs of the respective sensors.

The apparatus for controlling the introduction of air into an exhaust pipe of an internal combustion engine comprises: an exhaust bypass passage disposed in a portion of the exhaust pipe upstream of a catalyst; heating means disposed in the exhaust bypass passage; a changeover valve for changing over the flow of the exhaust gases between the exhaust pipe and the exhaust bypass passage; and controlling means for changing over the changeover valve in such a manner that the exhaust gases flow to the exhaust pipe when the introduction of air is stopped.

The apparatus for controlling the introduction of air into an exhaust pipe comprises: means for heating the air introduced into the air introducing pipe; and controlling means for varying the amount of air introduced into the exhaust pipe at a predetermined time interval and for varying also the magnitude of the amount of air introduced.

The apparatus for controlling the introduction of air into an exhaust pipe comprises: an exhaust bypass passage disposed in a portion of the exhaust pipe upstream of a catalyst; means for introducing air into the exhaust bypass passage via an air introducing pipe; means for heating the introduced air; a changeover valve for changing over the flow of exhaust gases between the exhaust pipe and the exhaust bypass passage; and controlling means for prohibiting the introduction of air to the exhaust bypass passage for a predetermined time duration subsequent to starting and for operating the changeover valve before a predetermined time duration prior to the introduction of air so as to allow the exhaust gases to flow to the exhaust bypass passage.

In this invention, the introduction of air to the exhaust pipe is not effected during starting or during starting and a predetermined time duration after starting, with the result that a further decline in the temperature of the exhaust gases whose temperature is low is prevented, and a decline in the purification efficiency of the catalyst immediately after starting does not occur.

In addition, the introduction of the heated air to the exhaust pipe is prohibited during engine starting or a predetermined time duration after starting, so that a decline in the exhaust gas temperature due to the introduction of the low-temperature heated air does not occur, thereby preventing a decline in the purification efficiency of the catalyst.

In addition, the heated air is introduced to the exhaust pipe after a predetermined time duration subsequent to starting, so that a decline in the purification efficiency of the catalyst due to a drop in the exhaust gas temperature does not occur. Furthermore, the amount of heated air introduced is varied at predetermined time intervals, and the atmosphere of the reaction system of the catalyst is alternately varied to the rich side and the lean side, thereby improving the purification efficiency of the catalyst.

In addition, the exhaust gases and the air introduced from the intake side are heated by the heating means disposed in the exhaust pipe, with the result that the exhaust gas temperature increases, thereby promoting the exhaust-gas purifying action in the exhaust pipe and the catalyst.

In addition, the heating means in the exhaust pipe is operated even after the stopping of the engine, and the soot adhering to the interior of the heating means through which the exhaust gases have ceased to flow is burned.

In addition, the air introduced into the exhaust pipe is heated, and the amount of air introduced is varied at predetermined time intervals, thereby improving the purification efficiency of the catalyst.

In addition, at least one of a time interval at which the amount of air introduced into the exhaust pipe is varied, the amount of variation, and the amount of heating by the heating means is varied in accordance with an operational parameter of the engine. Hence, optimum purification efficiency is obtained in accordance with the conditions of the exhaust gases and the catalyst.

In addition, the air introduced in the exhaust pipe and the catalyst are heated, and the reaction speed in the chemical reaction is accelerated. At the same time, the amount of air introduced is varied at predetermined time intervals, thereby improving the purification efficiency of the catalyst.

In addition, the amount of air introduced and the time interval of variation thereof are controlled in accordance with one of the exhaust gas temperature and the catalyst temperature. As a result, the overheating of the catalyst is prevented, and optimum introduction of air is effected in accordance with the operating condition of the engine.

In addition, at least one of a time interval at which the amount of air introduced into the exhaust pipe is varied, the amount of variation, the amount of air heated, and the amount of catalyst heated is varied in accordance with an operational parameter of the engine, so that optimum purification efficiency is obtain in accordance with the conditions of the exhaust gases and the catalyst.

In addition, the introduction of air into the exhaust pipe is started after a predetermined time duration after engine starting, so that a decline in the purification efficiency of the catalyst due to a drop in the exhaust gas temperature does not occur. In addition, the amount of air introduced is varied periodically, thereby promoting the exhaust-gas purifying action.

In addition, the exhaust gases are allowed to flow to the exhaust bypass passage only during the introduction of air to the exhaust side, thereby alleviating the effect of the heat of the exhaust gases on the heater and the like.

In addition, the introduction of air is started after a predetermined time duration subsequent to starting, so that a drop in the catalyst temperature due to the air introduced immediately after starting does not occur.

In addition, the heat capacity imparted by the exhaust gases to the catalyst after engine starting is detected, the degree of activity of the catalyst is detected from this heat capacity, and the introduction of air to the exhaust side is started when the degree of activity has reached a predetermined value.

In addition, the inlet temperature and outlet temperature of the catalyst are detected, and whether or not the catalyst has assumed an active state is determined from these temperatures, and the introduction of air to the exhaust pipe is stopped when the catalyst has assumed the active state. As a result, the temperature rise of the catalyst is promoted, and an increase in the amount of nitrogen oxides emitted owing to an oversupply of oxygen is prevented.

In addition, since the air-fuel ratio sensor is located in the exhaust pipe upstream of the connecting portion of the air introducing pipe, the air-fuel ratio of the exhaust gases alone is detected, so that accurate air-fuel-ratio control is carried out. In addition, the oxygen concentration in the vicinity of the catalyst is detected by the oxygen sensor, and air is introduced correspondingly in such a manner that an amount of oxygen necessary for the catalyst is obtained, thereby improving the purification efficiency of the catalyst.

In addition, the exhaust gases are allowed to flow to the exhaust bypass passage only during the introduction of air from the intake side to the exhaust side, so that the effect of the heat of the exhaust gases on the heater and the air introducing pipe is alleviated.

In addition, the air introduced to the exhaust pipe is heated, the amount of air introduced is varied at predetermined time intervals, and its magnitude is also varied.

In addition, the introduction of air to the exhaust side is not carried out for a predetermined time duration after starting, so that a decline in the purification efficiency does not occur. In addition, the exhaust gases are allowed to flow to the exhaust bypass passage only during the introduction of air to the exhaust side, thereby eliminating the effect of the heat of the exhaust gases.

BRIEF DESCRIPTION OF THE DRAWINGS

FIG. 10 is a schematic diagram in accordance with embodiment 5 of the apparatus of this invention;

FIG. 35 is a diagram of an output of an exhaust-gas temperature sensor in accordance with embodiment 17 of the apparatus of this invention;

DETAILED DESCRIPTION OF PREFERRED EMBODIMENTS

Embodiment 1

Figure 1:
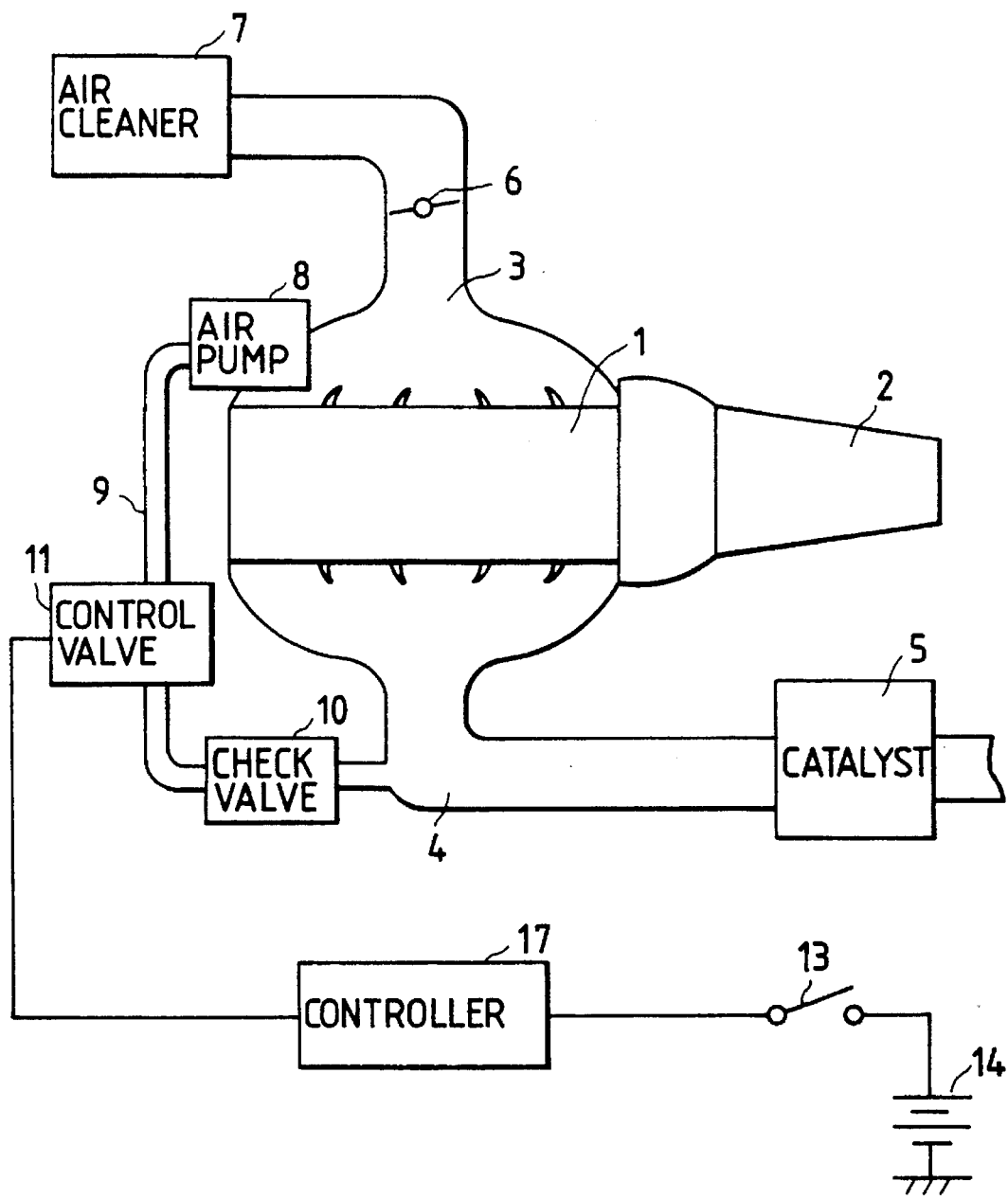
FIG. 1 is a schematic diagram in accordance with embodiment 1 of the apparatus of this invention.

Hereafter, a description will be given of the embodiments of this invention with reference to the drawings. FIG. 1 shows an apparatus for controlling the introduction of air into an exhaust pipe of an internal combustion engine in accordance with embodiment 1, in which, as the same as conventional art, reference numeral 1 denotes an internal combustion engine; 2, a transmission; 3, an intake pipe; 4, an exhaust pipe; 5, a catalyst disposed in the exhaust pipe 4; 6, a throttle valve disposed in the intake pipe 3; 7, an air cleaner disposed in an inlet portion of the intake pipe 3; 8, an air pump mounted on the internal combustion engine 1; 9, an air introducing pipe for introducing air to the exhaust pipe 4 upstream of the catalyst 5 by means of the air pump 8; 10, a check valve disposed in the air introducing pipe 9 for preventing the reverse flow of exhaust gases from the exhaust pipe 4, and 11, a control valve disposed in the air introducing pipe 9 for adjusting the amount of air to be introduced. Furthermore, reference numeral 17 denotes a controller for controlling the control valve 11; 13, a starter switch; and 14, a battery.

Figure 2:
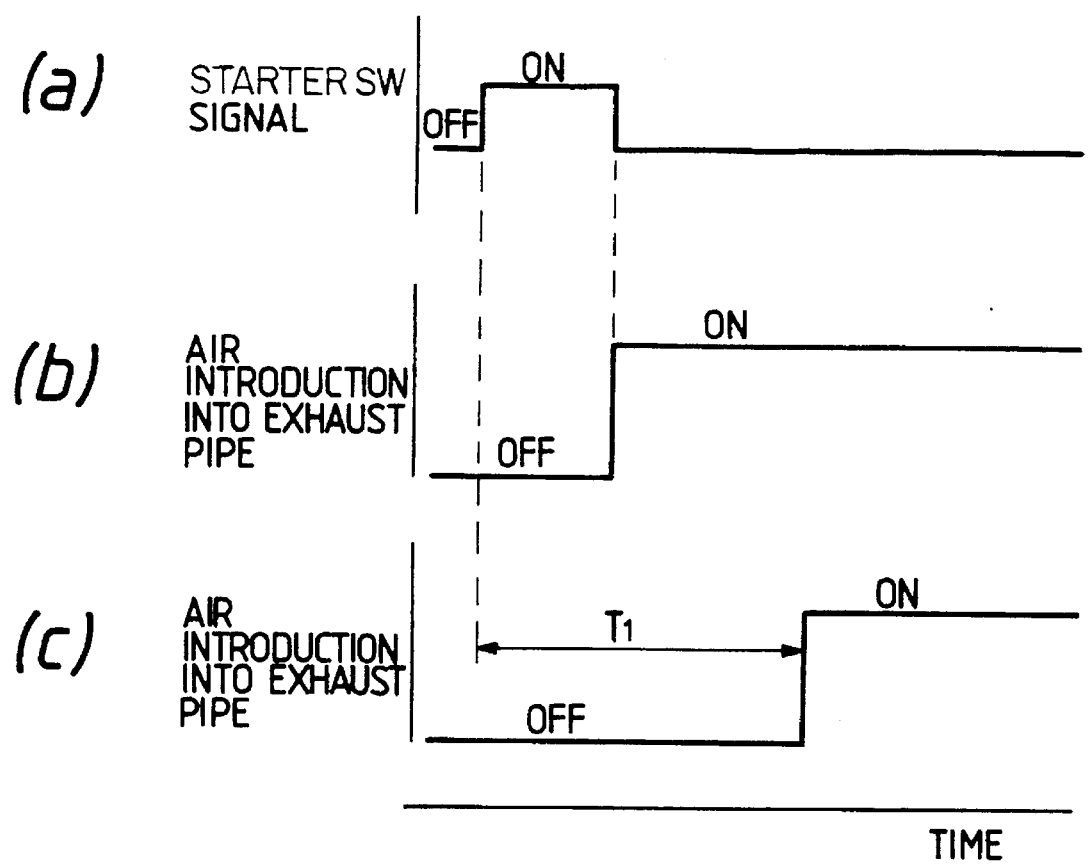
FIG. 2 is a timing chart illustrating the operation in accordance with embodiment 1 of the apparatus of this invention.

Next, a description will be given of the operation of embodiment 1. During and after the starting of an internal combustion engine 1, air is supplied into an air introducing pipe 9 by means of an air pump 8. Meanwhile, the controller 17 receives an on/off signal of the starter switch 13 shown in (a) part of FIG. 2, and does not allow the control valve 11 to be operated during the "on" period of the starter switch 13, as shown in (b) part, or until the lapse of a predetermined time duration $T_1$ after the turning on of the starter switch 13, as shown in (c) part. Accordingly, during this period, the control valve 11 remains closed and the introduction of air into the exhaust pipe 4 is not effected, thereby making it possible to prevent a decline in the purification efficiency due to a temperature drop of the exhaust gases in the exhaust pipe 4 immediately after starting. Subsequently, the control valve 11 is opened to introduce air into the exhaust pipe 4, and during this period it is possible to improve the efficiency of purifying the exhaust gases whose temperature has risen.

It should be noted that although in embodiment 1 the control valve 11 is controlled by means of the controller 17, in a case where the air pump 8 is of an electrically operated type, a similar effect can be obtained if the operation of the air pump 8 is controlled.

Embodiment 2

Figure 3:
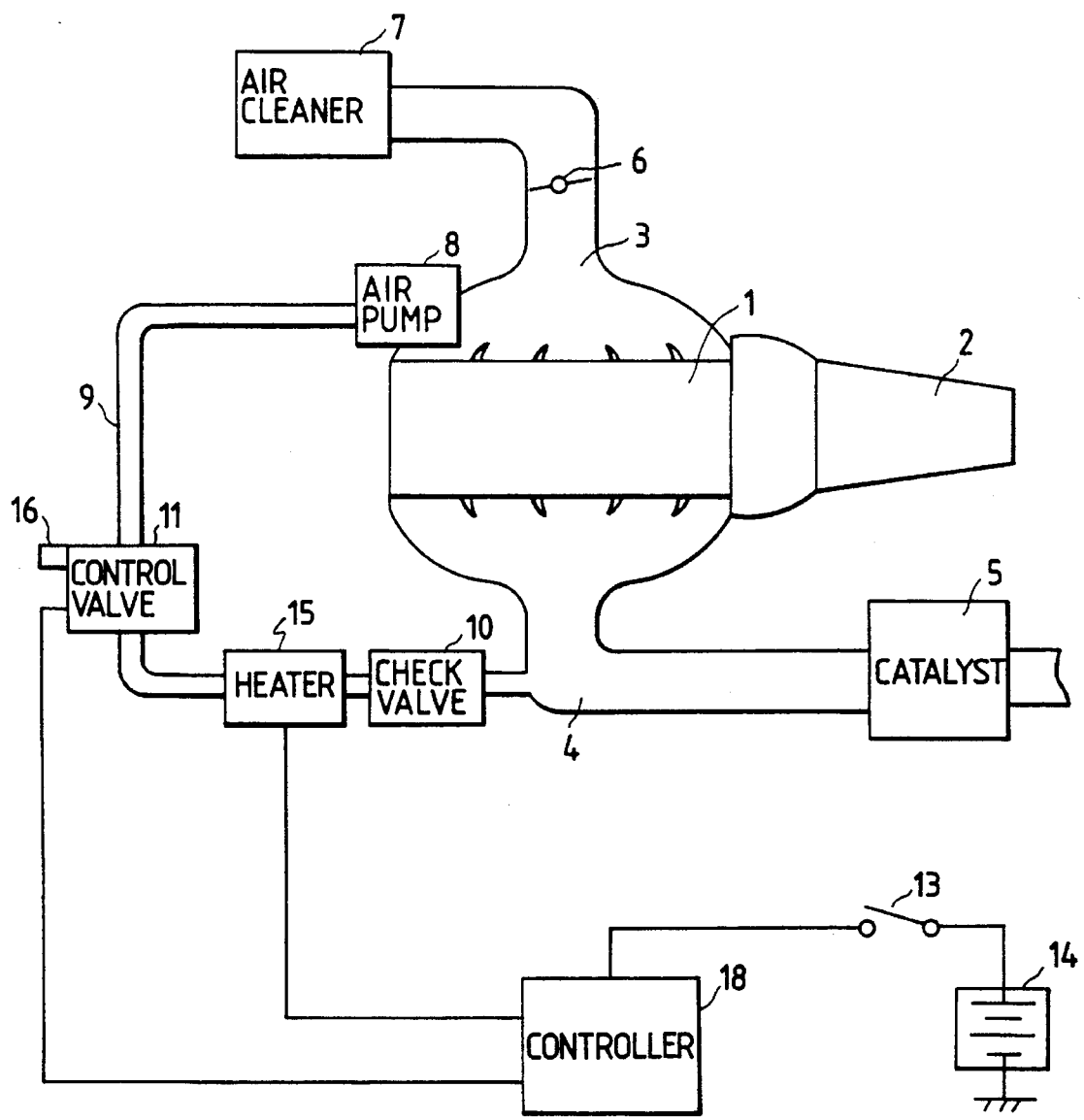
FIG. 3 is a schematic diagram in accordance with embodiment 2 of the apparatus of this invention.

FIG. 3 shows a configuration of embodiment 2, in which reference numeral 15 denotes a heater for heating the air passing through the air introducing pipe 9; 16, a relief valve attached to the control valve 11; 18, a controller for controlling the control valve 11 and the heater 15, and the other configuration is the same as described above.

Next, a description will be given of the operation of embodiment 2. Turning on of the starter switch 13 at the time of starting supplies the voltage of the battery 14 to the controller 18. The controller 18 operates the heater 15 as the starter switch is turned on. During and after the starting of the internal combustion engine 1, air is introduced into the air introducing pipe 9 in correspondence with the rotation of the internal combustion engine 1 as the air pump 8 is operated. However, as shown in (b) part of FIG. 4, since the controller 18 does not open the control valve 11 for the predetermined time duration $T_1$ after the turning on of the starter switch 13, air is not supplied to the exhaust pipe 4. After the lapse of the time duration $T_1$, the control valve 11 is opened, so that the heated air is supplied to the exhaust pipe 4. In this case, the air temperature at the outlet of the heater 15 is shown in FIG. 5 by dotted line b, and the speed of temperature rise becomes faster than in the conventional case shown by solid line a, with the result that the efficiency of purification at the catalyst 5 improves.

Figure 4:
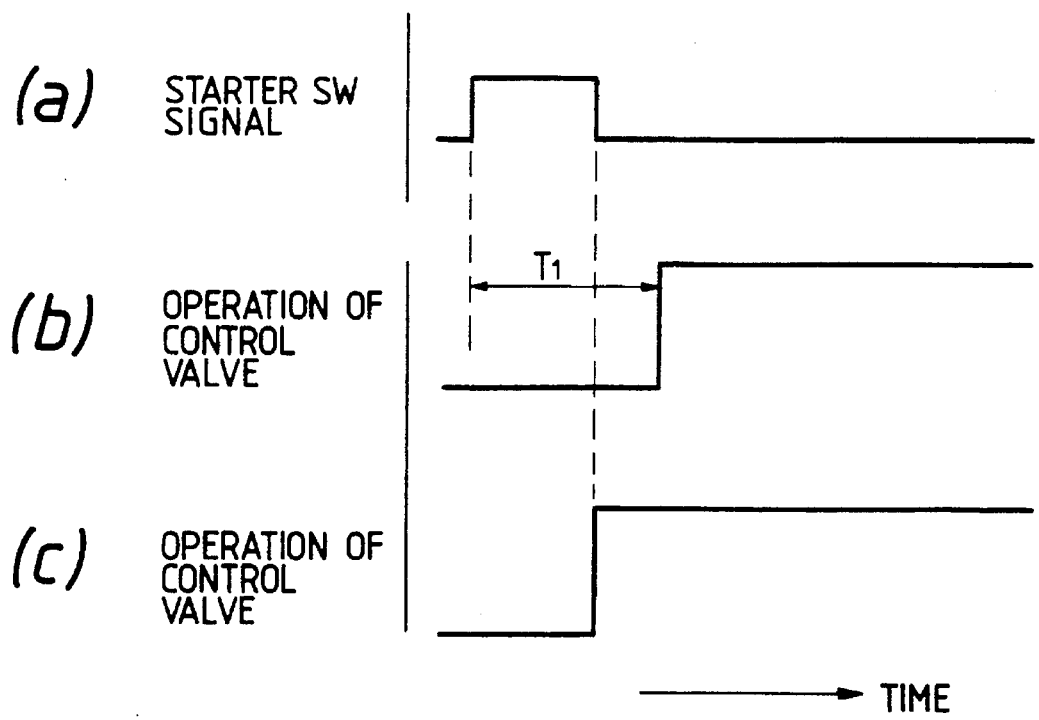
FIG. 4 is a timing chart illustrating the operation in accordance with embodiment 2 of the apparatus of this invention.
Figure 5:
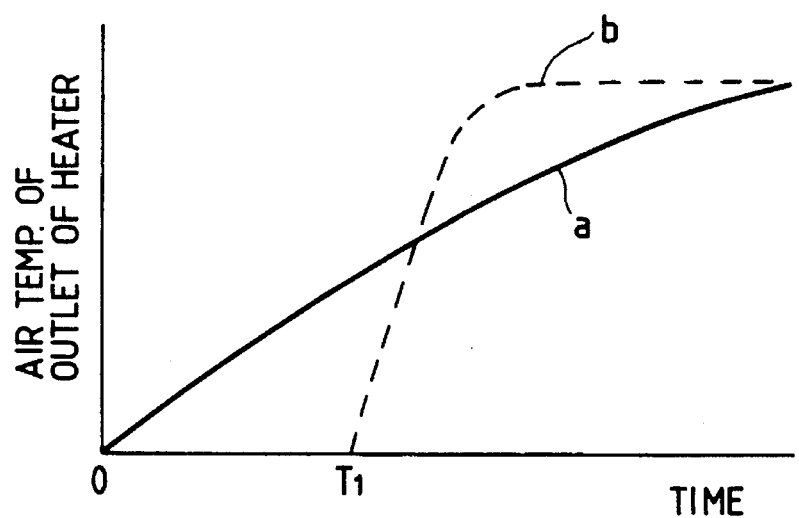
FIG. 5 is a diagram of fluctuations of the outlet temperature of the heater in accordance with embodiment 2 of the apparatus of this invention.

Although, in embodiment 2, the control valve 11 is not opened for the time duration $T_1$ after the turning on of the starter switch 13, a similar effect is obtained if the control valve 11 is not opened during starting, i.e., during the "on" period of the starter switch 13, as shown in part (c) of FIG. 4. In addition, in a case where the air pump 8 is of an electrically operated type, the air pump 8 may not be operated during starting or during a predetermined period after starting without using the control valve 11.

Embodiment 3

Figure 6:
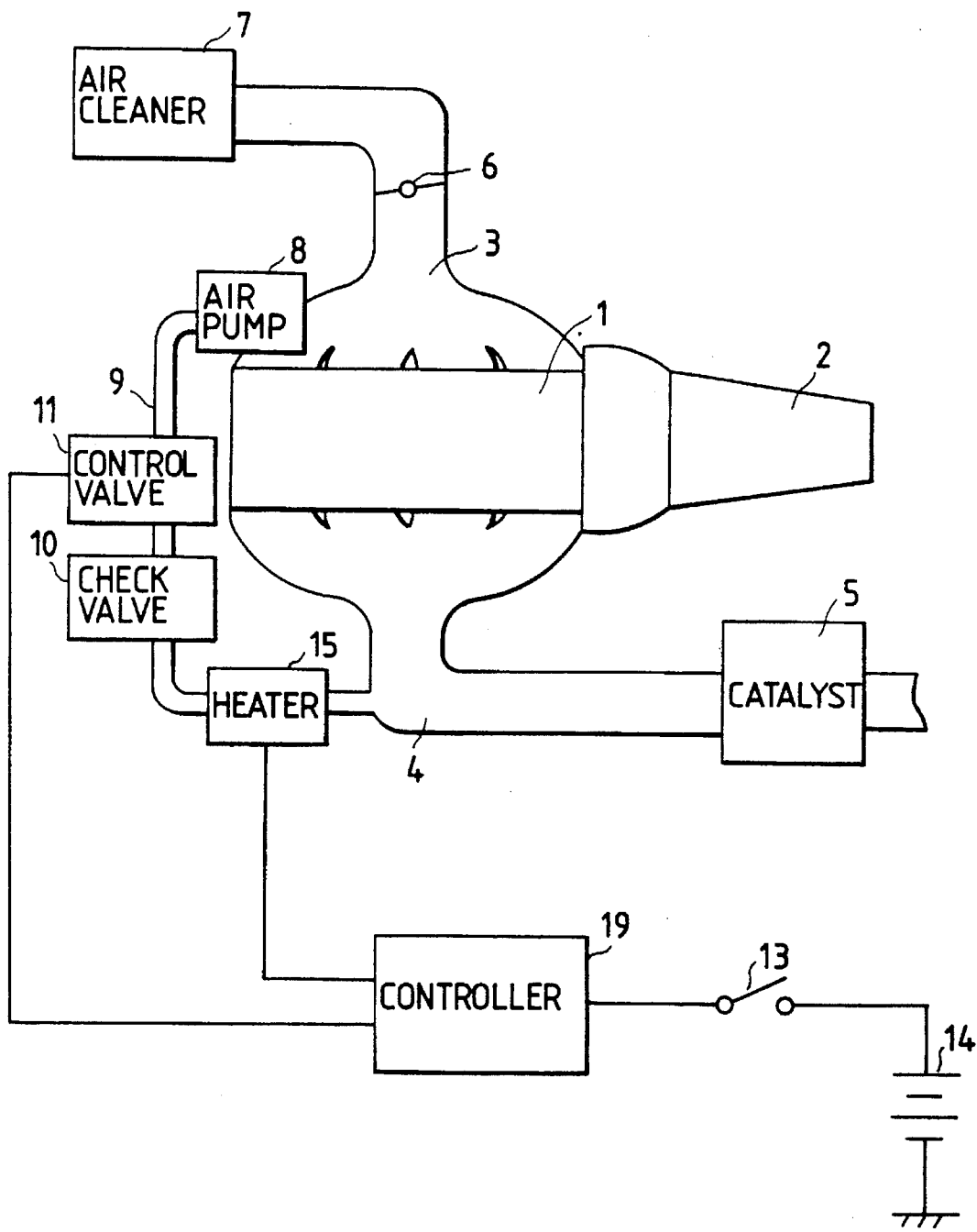
FIG. 6 is a schematic diagram in accordance with embodiment 3 of the apparatus of this invention.

FIG. 6 shows a configuration of embodiment 3, in which reference numeral 19 denotes a controller for controlling the control valve 11 and the heater 15. The other configuration is the same as described above.

Figure 7:
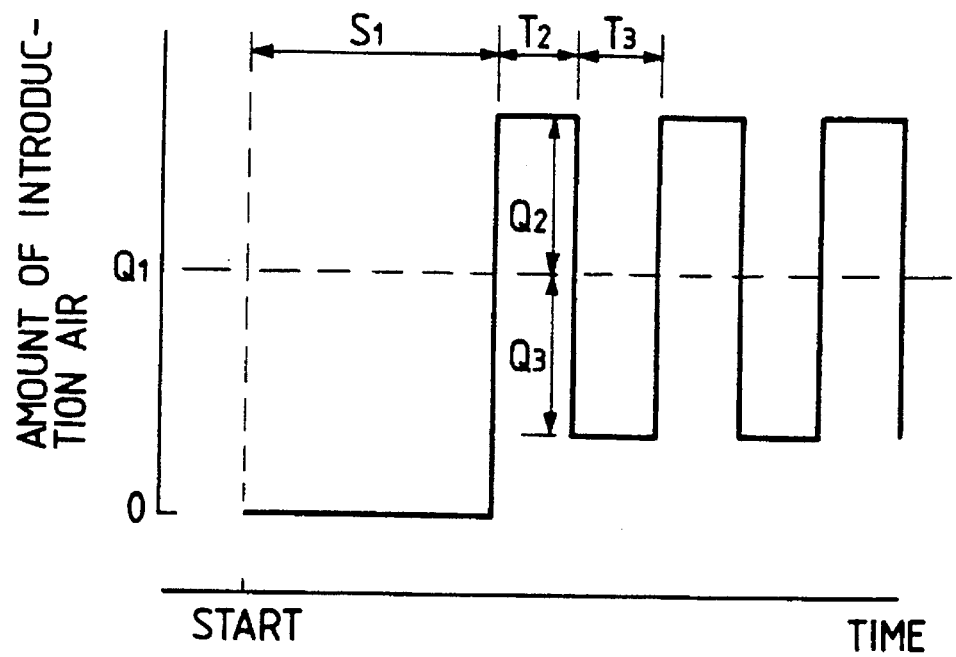
FIG. 7 is a diagram of variation of the amount of air introduced in accordance with embodiment 3 of the apparatus of this invention.

Next, a description will be given of the operation of embodiment 3. At the same time as the internal combustion engine 1 is started, air is introduced into the air introducing pipe 9 by the operation of the air pump 8. However, the controller 19 does not turn on the control valve 11 for a time duration $S_1$ after the starter switch 13 is turned on. For this reason, the amount of air introduced to the exhaust side is zero for the time duration $S_1$, as shown in FIG. 7. Meanwhile, the controller 19 operates the heater 15 simultaneously with starting. After the lapse of the time duration $S_1$ subsequent to starting, the controller 19 opens the control valve 11, and the air introduced from the intake side is supplied to the exhaust pipe 4 via the check valve 10 and the heater 15. Accordingly, the temperature of the air supplied to the exhaust pipe 4 is increased to an appropriate temperature level, and the decline in the catalyst efficiency due to the drop in the exhaust gas temperature does not occur.

In addition, the amount of air introduced into the exhaust pipe 4 is varied alternately by $Q_2$ and $Q_3$ above or below $Q_1$, which is set as a reference, at predetermined time intervals $T_2$ and $T_3$ through control by the controller 19. As a result, as described in 861012 "Improvement of low-temperature activity of ternary catalysts" in JSAE Spring Convention Proceedings 861, 1986-5, the atmosphere of a reaction system in which a ternary catalyst is used is changed periodically to the rich side and the lean side, thereby making it possible to substantially improve the purification efficiency of the catalyst. The period of $T_2+T_3$ is normally set to 1–10 Hz or thereabouts, and this period, together with $Q_1$ to $Q_3$, is set to an optimum value in accordance with the catalyst being used.

In embodiment 3, the heated air is not introduced into the exhaust pipe 4 for the time duration $S_1$ after the starting of the engine, but in the case where the air pump 8 is of an electrically operated type, a similar effect is obtained if the air pump 8 is controlled by the controller 19 without providing the control valve 11.

Embodiment 4

Figure 8:
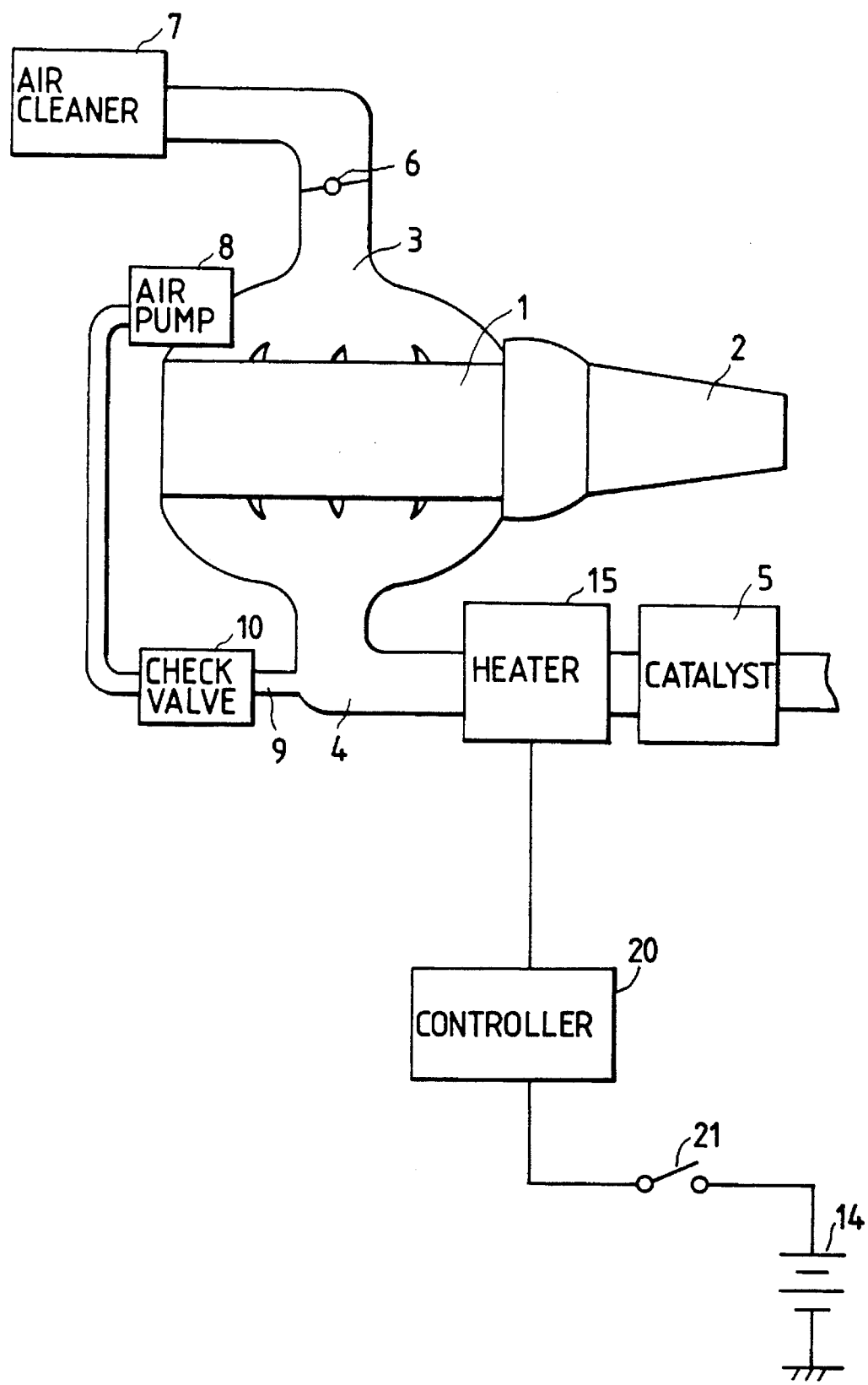
FIG. 8 is a schematic diagram in accordance with embodiment 4 of the apparatus of this invention.

FIG. 8 illustrates a configuration in accordance with embodiment 4, in which reference numeral 20 denotes a controller for controlling the heater 15, and 21 denotes a key switch, the heater 15 being disposed between the catalyst 5 and a connecting portion of the air introducing pipe 9 in the exhaust pipe 4. The other configuration is the same as described above.

Figure 9:
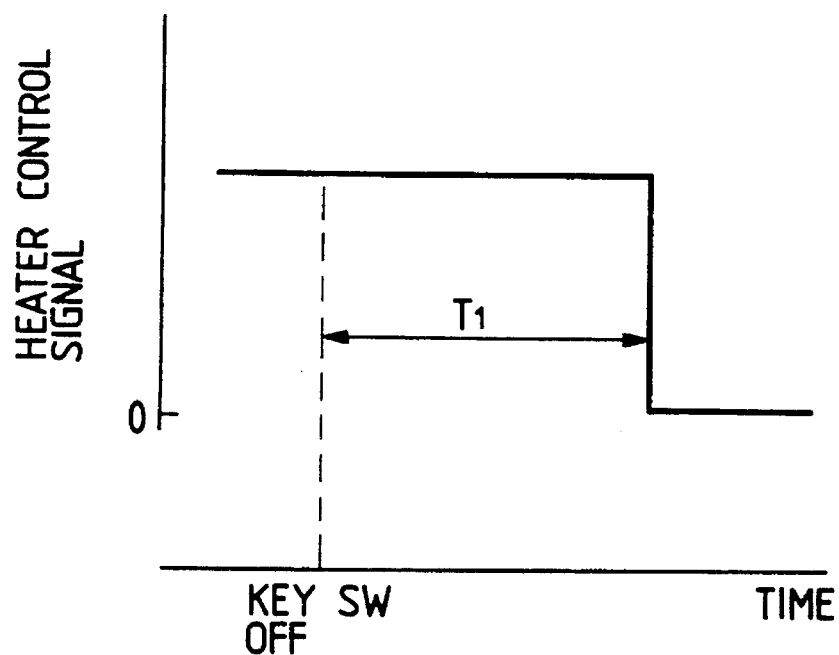
FIG. 9 is a waveform diagram of the operation of the heater in accordance with embodiment 4 of the apparatus of this invention.

Next, a description will be given of the operation of embodiment 4. As the internal combustion engine 1 rotates, the air pump 8 rotates, which causes air to be introduced into the exhaust pipe 4 via the air introducing pipe 9. Meanwhile, the heater 15 is operated by the controller 20 at the same time as the starting of the engine. The air introduced into the exhaust pipe 4 is mixed with the exhaust gases, is sent to the heater 15, and is thereby heated. Accordingly, the temperature of the gas mixture increases, so that the efficiency of purification of the exhaust gases in the catalyst 5 improves. In addition, as shown in FIG. 9, since the heater 15 is operated for the time duration $T_1$ even after the key switch 21 is turned off, the heater 15 maintains the heating condition, and when the engine is stopped and the exhaust gases no longer flow through the heater 15, the soot adhering inside the heater 15 is burned. For this reason, the heater 15 is capable of constantly allowing the exhaust gases to flow satisfactorily.

Embodiment 5

FIG. 10 illustrates a configuration in accordance with embodiment 5, in which reference numeral 22 denotes an air-flow sensor for detecting the amount of air taken into the internal combustion engine 1; 23, a revolution sensor for detecting the number of revolutions of a crankshaft of the internal combustion engine 1; 24, a coolant temperature sensor for detecting the temperature of a coolant for cooling the internal combustion engine 1; 25, an oil temperature sensor for detecting the temperature of oil in the internal combustion engine 1 and the transmission; 26, an intake manifold pressure sensor for detecting the downstream negative pressure of the throttle valve 6; 27, an intake-air temperature sensor for detecting the intake-air temperature of the atmospheric air; 28, an atmospheric pressure sensor for detecting the atmospheric pressure of the outside air; 29, a throttle opening sensor for detecting the opening of the throttle valve 6; 30, an exhaust pressure sensor for detecting the pressure of exhaust gases flowing through the exhaust manifold; 31, an exhaust-gas temperature sensor; 32, an introduced-air temperature sensor; 36, a catalyst temperature sensor; and 33, a controller to which various parameters of the internal combustion engine 1 are inputted, and which perform various determinations and calculations in accordance with these parameters, so as to control the heater 15 and the control valve 11.

Figure 11A:
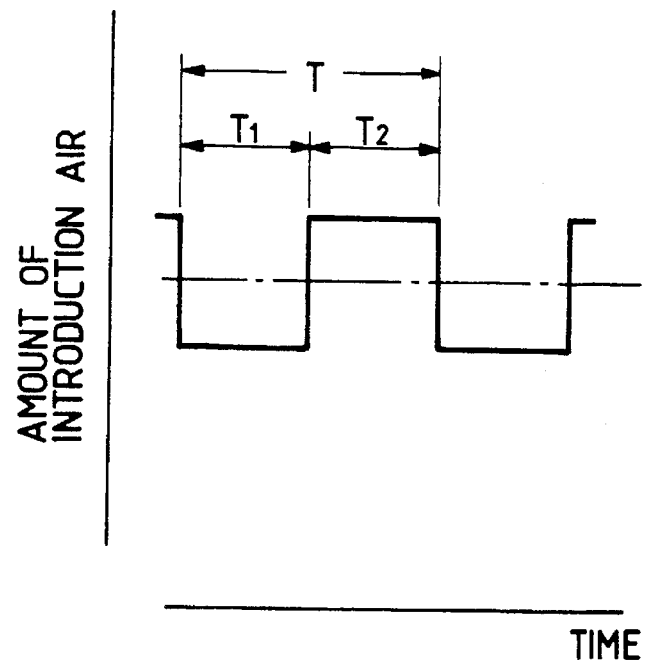
FIG. 11 is a diagram of variation of the amount of air introduced in accordance with embodiment 5 of the apparatus of this invention.
Figure 11B:
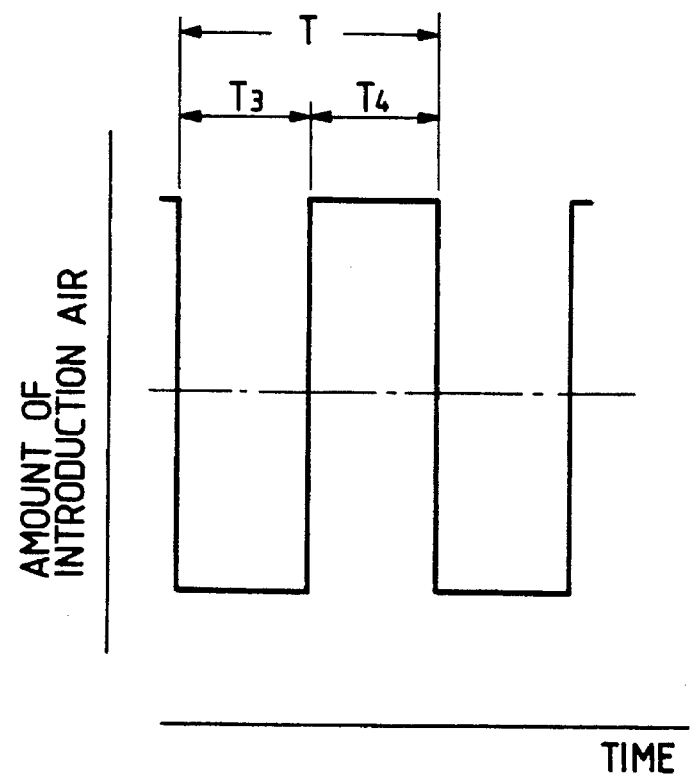

Next, a description will be given of the operation of embodiment 5. As the internal combustion engine 1 rotates, the air pump 8 rotates, which causes air to be introduced into the exhaust pipe 4 via the air introducing pipe 9. The amount of air introduced at this time is varied alternately to the lean side and the rich side at predetermined time intervals $T_1$, $T_2$ or $T_3$, $T_4$, as shown in FIGS. 11(a) and 11(b), by controlling the control valve 11 by means of the controller 33. The purification efficiency improves through such variations, as described above. In addition, the introduced air is heated by the heater 15, whereby the purification efficiency also improves. The time intervals $T_1$ to $T_4$ are set to be periods of 1 to 10 Hz or thereabouts, and they are varied in accordance with the type, amount, and condition of the catalyst 5 used.

Figure 12:
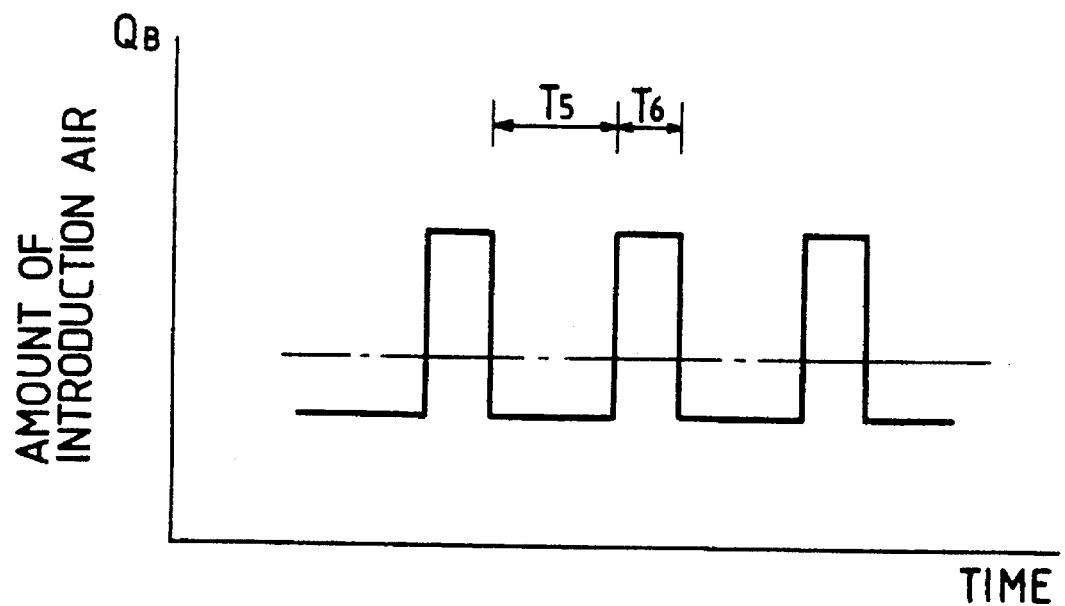
FIG. 12 is a diagram of variation of the amount of air introduced in accordance with embodiment 5 of the apparatus of this invention.
Figure 13:
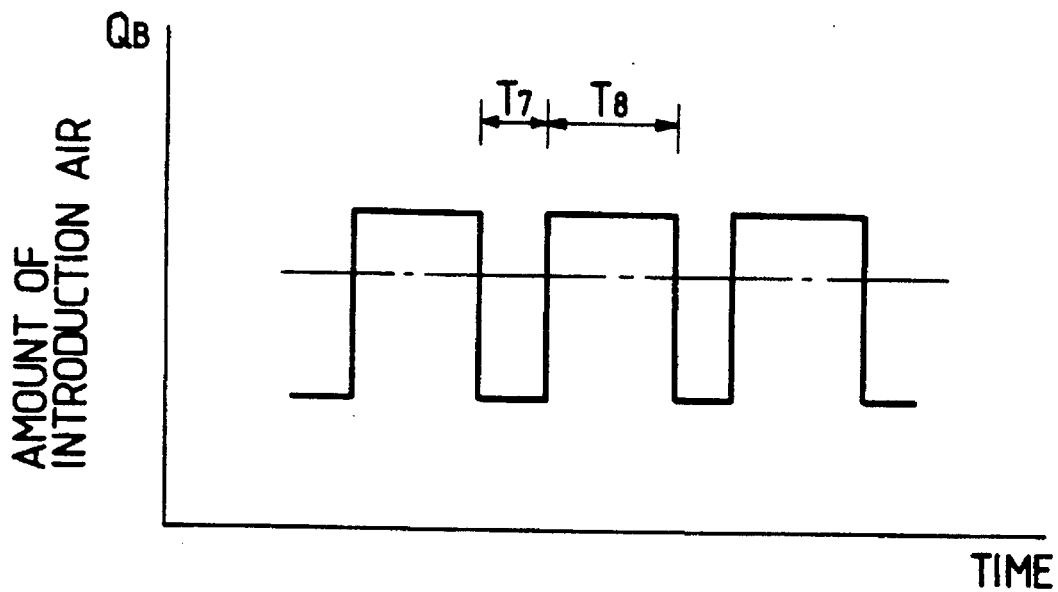
FIG. 13 is a diagram of variation of the amount of air introduced in accordance with embodiment 5 of the apparatus of this invention.

Although, in embodiment 5, the amount of air introduced is varied at the time intervals $T_1$ to $T_4$, by changing the ratio between a time interval $T_6$ or $T_8$ when the amount of air introduced is large and a time interval $T_5$ or $T_7$ when it is small, i.e., the duty, as shown in FIGS. 12 and 13, it is possible to allow the average flow rate to assume an optimum value in accordance with the component, amount, and condition of the catalyst 5 and the operating condition of the internal combustion engine 1. In addition, although the air from the intake side is introduced from the intake manifold located downstream of the throttle valve 6 by means of the air pump 8, the air may be introduced from the upstream of the throttle valve 6, or from the upstream of the air flow sensor 22, or by providing an introducing port separate from the air cleaner 7. Furthermore, as the control valve 11, it is possible to use a linear solenoid for controlling the opening by means of a duty signal, a duty solenoid for controlling the flow rate by means of an on-off signal, a valve which is controlled by a stepping motor, a DC motor, or an ultrasonic motor, or a valve for controlling the opening through negative pressure.

Embodiment 6

Figure 14A:
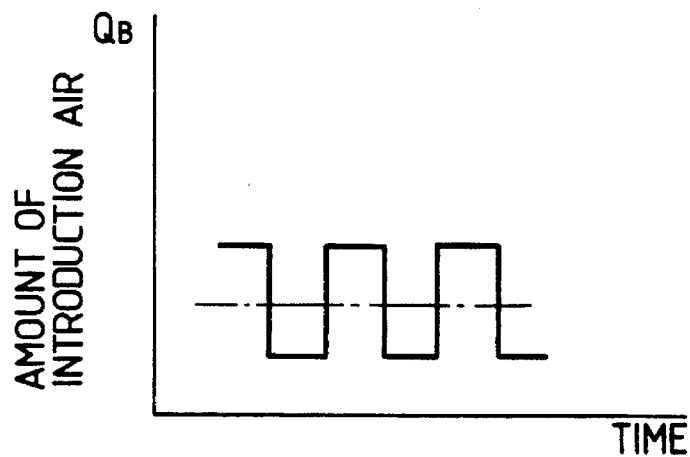
FIG. 14A and 14B are diagrams of variation of the amount of air introduced in accordance with embodiment 6 of the apparatus of this invention.
Figure 14B:
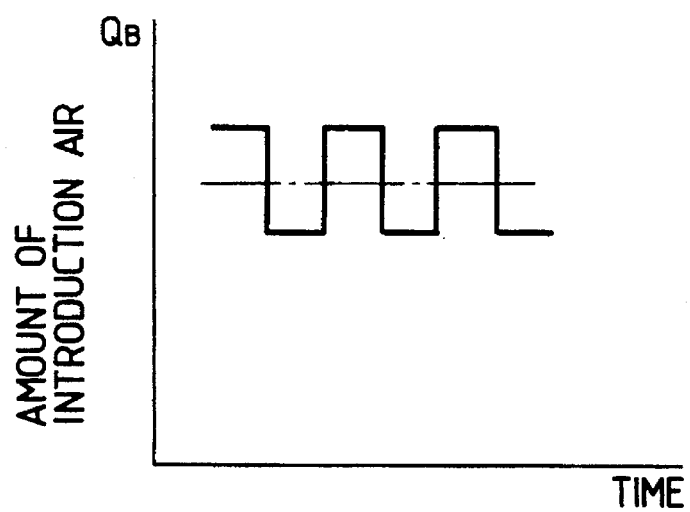

Although, in embodiment 5, a case has been shown in which the time intervals are varied, an arrangement may be provided such that the amplitude of variation (amount of variation) of the introduced air is made variable so as to assume an optimum value in accordance with the component, amount, and condition of the catalyst 5 and the operating condition of the internal combustion engine 1. That is, there is a case where only the amplitude of variation is changed in accordance with the capacity of the catalyst 5, as shown in FIG. 11(a) and 11(b), and there is a case where both the value when the amount of air introduced is large and the value when it is small are changed in accordance with the condition of the catalyst 5 and the operating condition of the internal combustion engine 1, as shown in FIGS. 14(a) and 14(b), so as to set the values to optimum values.

Embodiment 7

By combining the embodiments 5 and 6, both the time intervals of variation of the amount of air introduced and the amplitude of variation thereof are changed and set more optimally in accordance with the component, amount, and condition of the catalyst 5 and the operating condition of the internal combustion engine 1.

Embodiment 8

By changing the time intervals of variation of the amount of air introduced and the amount of variation thereof in accordance with the operational parameters of the internal combustion engine 1, more finely-tuned control becomes possible, and the purification of exhaust gases in an ideal manner can be implemented. As the operational parameters, it is possible to cite, among others, the exhaust gas temperature, catalyst temperature, exhaust pressure, engine speed, amount of intake air, throttle opening, intake manifold pressure, coolant temperature, oil temperature, intake air temperature, and atmospheric pressure. A description will be given of a case where if, for instance, the amount of air taken into the engine is $Q_A$ and the amount of air introduced into the exhaust pipe 4 is $Q_B$, $$Q_B = K \, Q_A \tag{1}$$

and the amount of air introduced $Q_B$ is varied in accordance with the amount of intake air $Q_A$.

Figure 15:
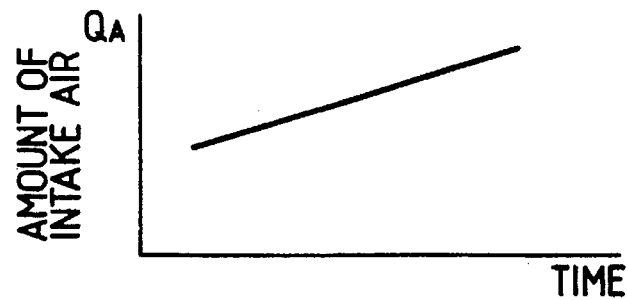
FIG. 15 is a diagram of variation of the amount of air intake in accordance with embodiment 8 of the apparatus of this invention.
Figure 16:
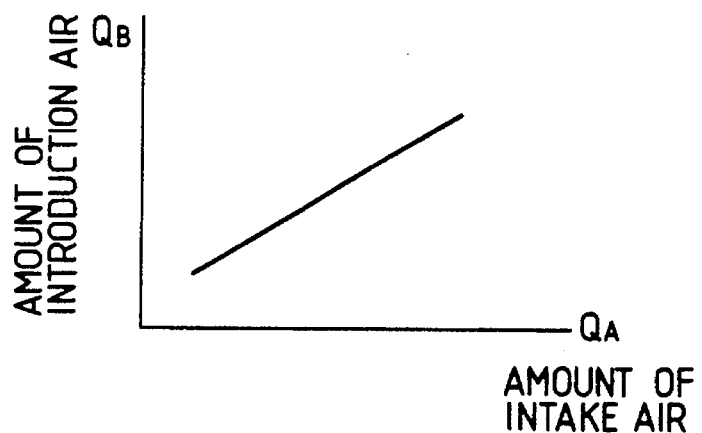
FIG. 16 is a diagram of relationship between the amount of air intake and the amount of air introduced in accordance with embodiment 8 of the apparatus of this invention.
Figure 17:
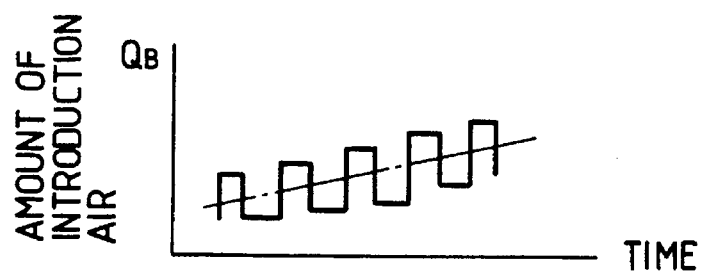
FIG. 17 is a diagram of variation of the amount of air introduced in accordance with embodiment 8 of the apparatus of this invention.

When $Q_A$ increases with time, as shown in FIG. 15, $Q_B$ also needs to be increased correspondingly. At this time, if $Q_A$ and $Q_B$ are in a linear relationship, as shown in FIG. 16, it suffices if $Q_B$ is set as in FIG. 17. The amount of intake air $Q_A$ may be measured by the air flow sensor 22, but a value equivalent to the amount of intake air may be determined by the throttle opening sensor 29, the intake manifold pressure sensor 26, or the like. In particular, since the throttle opening makes it possible to speedily ascertain the accelerating or decelerating behavior of the vehicle driver, $Q_B$ can be changed speedily in response to a sudden change in the operating condition of the engine.

Figure 18:
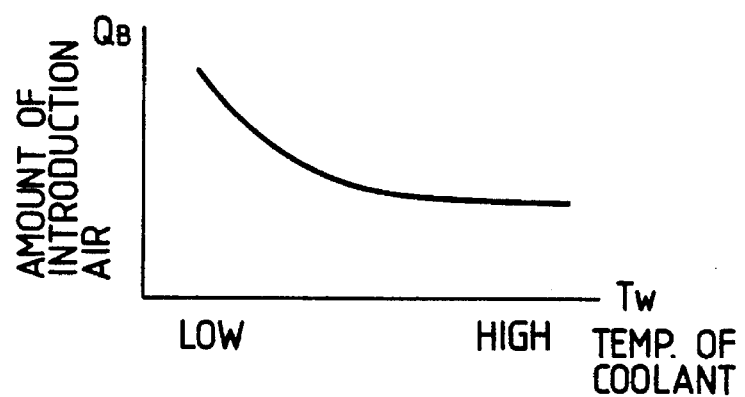
FIG. 18 is a diagram of relationship between the coolant temperature and the amount of air introduced in accordance with embodiment 8 of the apparatus of this invention.

FIG. 18 shows a relationship between an engine coolant temperature $T_W$ and the amount of air introduced $Q_B$. When the coolant temperature $T_W$ is low, a rich air-fuel mixture is normally supplied to the engine, the efficiency of purifying unburnt exhaust gas components can be improved by increasing the amount of air introduced $Q_B$. However, since components of the exhaust gases actually change in various ways due to the setting of the air-fuel ratio and the like, it is possible to obtain an optimum amount of air introduced $Q_B$ by taking various conditions into account.

Figure 19:
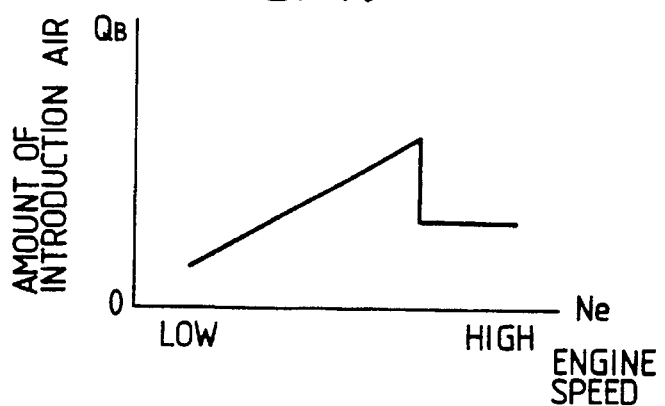
FIG. 19 is a diagram of relationship between the engine speed and the amount of air introduced in accordance with embodiment 8 of the apparatus of this invention.
Figure 20:
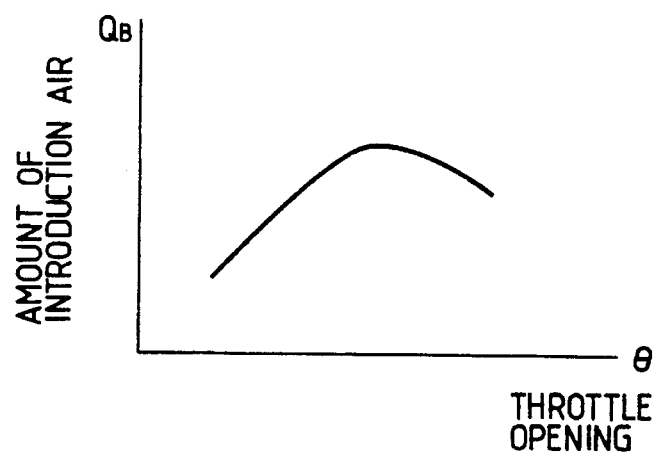
FIG. 20 is a diagram of relationship between the throttle opening and the amount of air introduced in accordance with embodiment 8 of the apparatus of this invention.

FIG. 19 shows the relationship between the engine speed and $Q_B$, and $Q_B$ is increased on the assumption that an increase in the engine speed No entails an increase in the amount of intake air per time. In a region of very high revolution, the amount of heat generated due to oxidation reaction in the catalyst 5 becomes excessively large, so that $Q_B$ is reduced. FIG. 20 shows the relationship between a throttle opening $\theta$ and $Q_B$.

Figure 21:
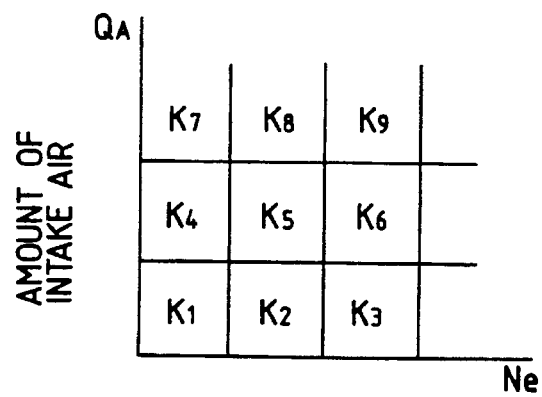
FIG. 21 is a data map of the amount of air introduced in accordance with embodiment 8 of the apparatus of this invention.

FIG. 21 shows a case where a parameter for determining $Q_B$ is provided as map values with respect to two parameters, the engine speed $N_e$ and the amount of intake air $Q_A$, and by using coefficients $K_1$ to $K_9$ of nine zones, $Q_B$ is determined on the basis of $$Q_B = K_n + Q_A \tag{2}$$

In addition, $Q_B$ may be determined irrespective of $Q_A$ by using coefficients $K_1$ to $K_9$. That is, $Q_B$ may be made equal to $K_n$. Furthermore, by assuming that $T_e$ is the exhaust gas temperature, $T_o$ is the oil temperature, $P_b$ is the atmospheric pressure, $T_a$ is the intake air temperature, $P_i$ is the intake manifold pressure, $T_c$ is the catalyst temperature, $T_1$ is the temperature of the introduced air, and functions using them as variables are $FQ_A(X)$, $FT_W(X)$, $FN_e(X)$, $F\theta(X)$, $FT_e(X)$, $FT_o(X)$, $FP_b(X)$, $FT_a(X)$, $FP_i(X)$, $FT_c(X)$, and $FT_1(X)$, a setting may be provided as follows:

$$\begin{aligned}Q_B = &\; FQ_A(Q_A) + FT_W(T_W) + FN_e(N_e) + F\theta(\theta) + \\ & FT_e(T_e) + FT_o(T_o) + FP_b(P_b) + FT_a(T_a) + \\ & FP_i(P_i) + FT_c(T_c) + FT_1(T_1)\end{aligned} \tag{3}$$

Alternatively, the functions may be combined by multiplication as follows:

$$\begin{aligned}Q_B = &\; FQ_A(Q_A) * FT_W(T_W) * FN_e(N_e) * F\theta(\theta) * \\ & FT_e(T_e) * FT_o(T_o) * FP_b(P_b) * FT_a(T_a) * \\ & FP_i(P_i) * FT_c(T_c) * FT_1(T_1)\end{aligned} \tag{4}$$

In addition, it is possible to combine addition and multiplication, or it is possible to use a function $F(X_1, X_2, X_3, \ldots, X_n)$ which is determined by two or more parameters. Although a description has been given of the case where the amount of air introduced $Q_B$ is varied in accordance with the parameters of the operating condition of the engine, the periodically changing time intervals and the amount of variation of the amount of air introduced $Q_B$ may be varied in accordance with the parameters.

Embodiment 9

Figure 22:
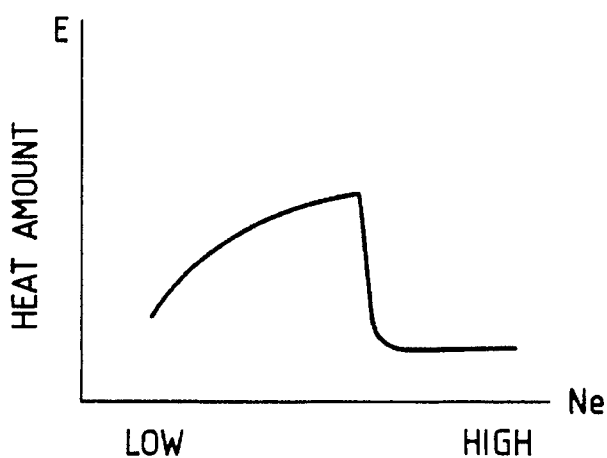
FIG. 22 is a diagram of relationship between the engine speed and the amount of heating in accordance with embodiment 9 of the apparatus of this invention.
Figure 23:
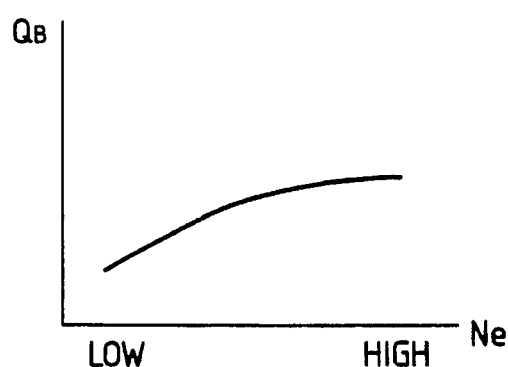
FIG. 23 is a diagram of relationship between the engine speed and the amount of air introduced in accordance with embodiment 9 of the apparatus of this invention.
Figure 24:
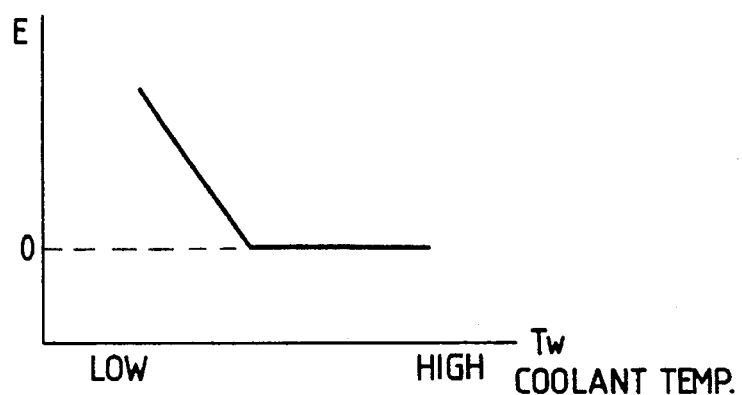
FIG. 24 is a diagram of relationship between the coolant temperature and the amount of heating in accordance with embodiment 9 of the apparatus of this invention.
Figure 25:
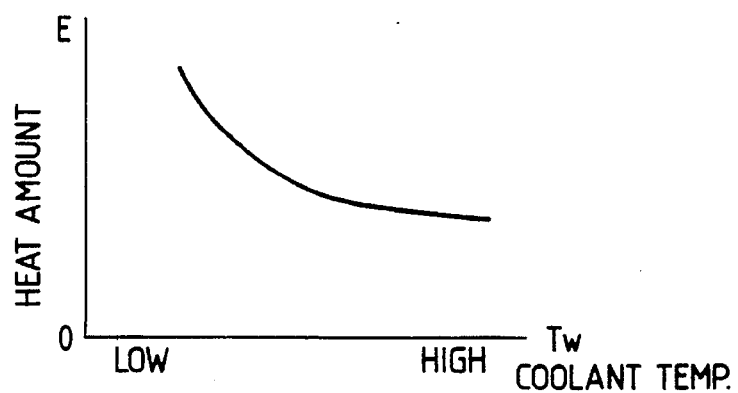
FIG. 25 is a diagram of relationship between the coolant temperature and the amount of heating in accordance with embodiment 9 of the apparatus of this invention.
Figure 26:
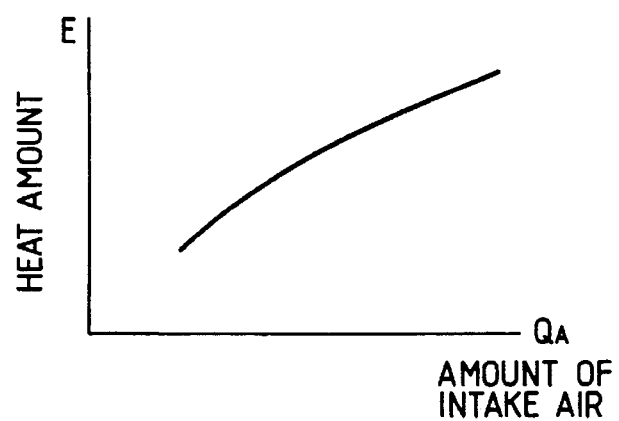
FIG. 26 is a diagram of relationship between the amount of air intake and the amount of heating in accordance with embodiment 9 of the apparatus of this invention.
Figure 27:
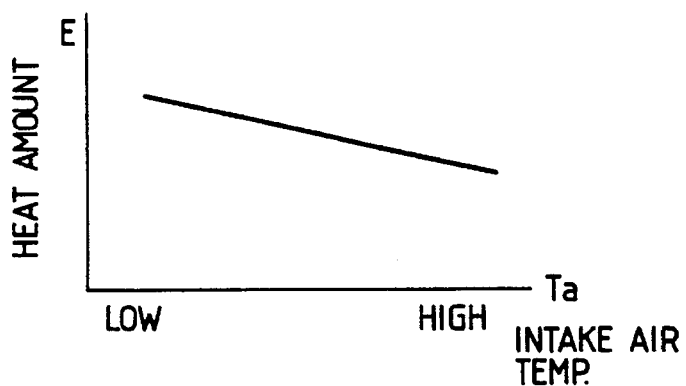
FIG. 27 is a diagram of relationship between the intake air temperature and the amount of heating in accordance with embodiment 9 of the apparatus of this invention.
Figure 28:
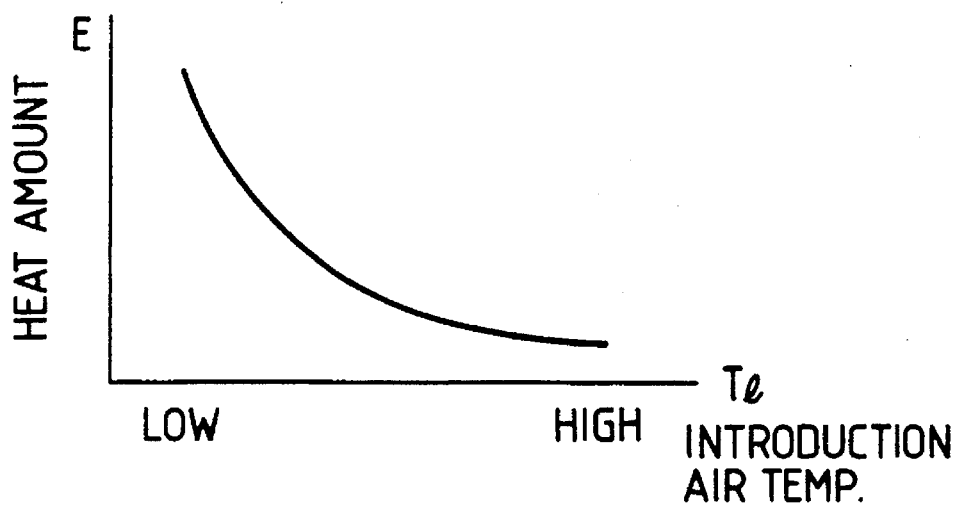
FIG. 28 is a diagram of relationship between the introduced air temperature and the amount of heating in accordance with embodiment 9 of the apparatus of this invention.
Figure 29:
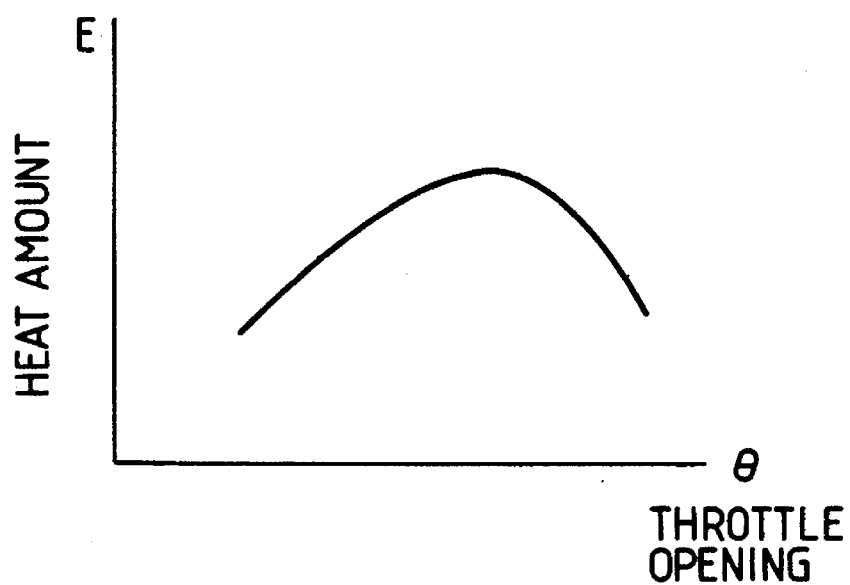
FIG. 29 is a diagram of relationship between the throttle opening and the amount of heating in accordance with embodiment 9 of the apparatus of this invention.

Although, in embodiment 8, the amount of introduced air to be controlled is varied in accordance with the operational parameters of the engine, the amount of heat to be imparted to the heater 15 may additionally be varied in accordance with the engine parameters. For instance, in FIG. 19, $Q_B$ is decreased since the amount of heat generated due to the oxidation reaction in the catalyst in the region of very high revolution becomes excessively large. At that time, an arrangement may be provided such that, as shown in FIG. 22, the amount of heat in the heater 15 is reduced or cut off, and the normal-temperature air is introduced, so as to cool the catalyst 5, or, as shown in FIG. 23, an attempt may be made not to decrease $Q_B$. FIGS. 24 to 29 show examples in which the amount of introduced air heated by the heater 15 is varied in accordance with the coolant temperature $T_W$, the amount of air $Q_A$ taken into the engine, the intake air temperature $T_a$, and the temperature of introduced air $T_1$, respectively.

Embodiment 10

Figure 30:
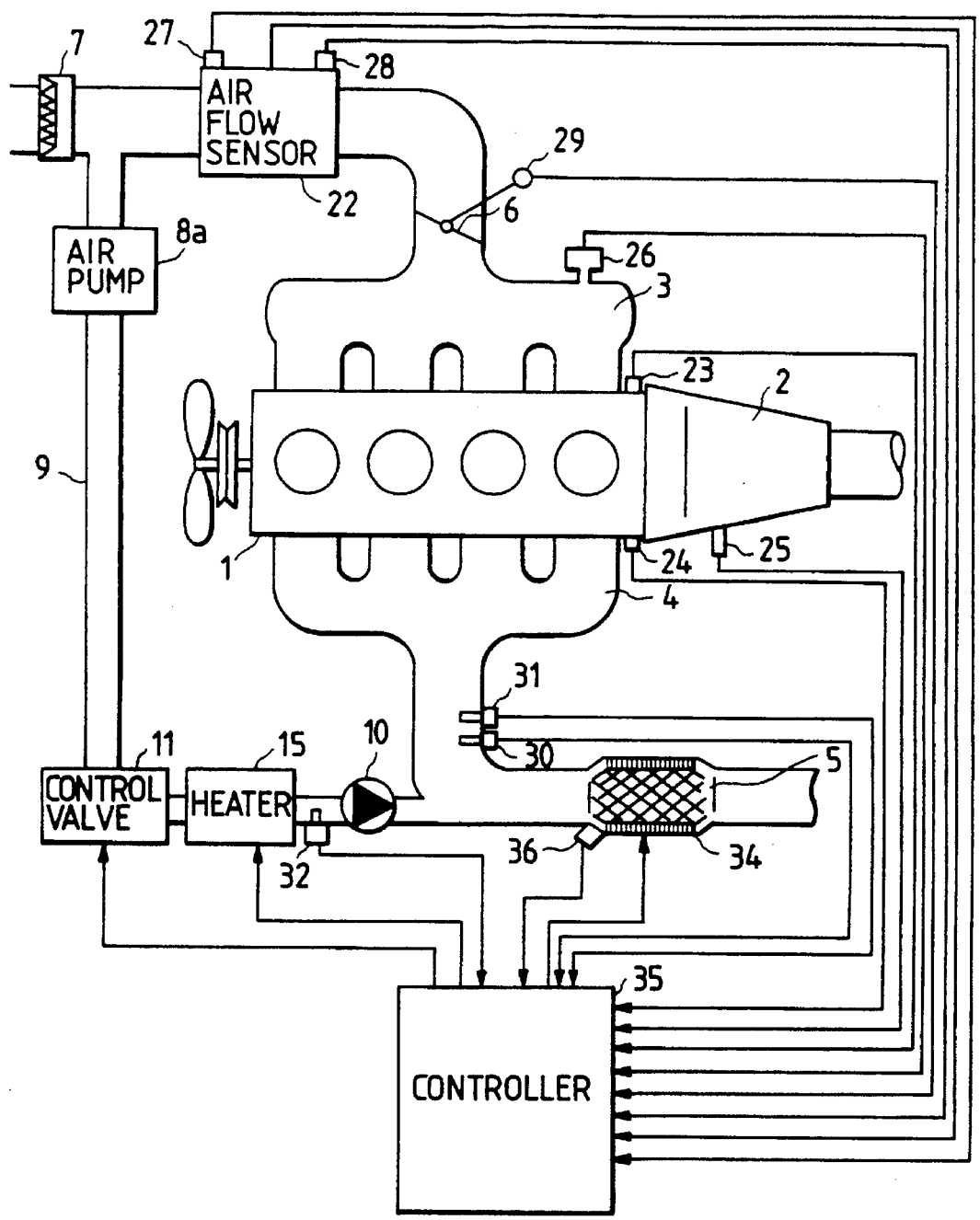
FIG. 30 is a schematic diagram in accordance with embodiment 10 of the apparatus of this invention.

FIG. 30 shows a configuration in accordance with embodiment 10, in which reference numeral 8a denotes an electrically operated air pump of, for instance, a turbo type or a stroke type and driven by a DC motor; 34, a catalyst heater for heating the catalyst 5; 36, a catalyst temperature sensor; and 35, a controller to which the various parameters of the internal combustion engine 1 are inputted and which perform various determinations and calculations in accordance with these parameters so as to control the heaters 15, 34 and the control valve 11. The other configuration is the same as described above.

Next, a description will be given of the operation of embodiment 10. The air which has been purified by being passed through the air cleaner 7 is sucked by the air pump 8a, and is introduced into the air introducing pipe 9. The control valve 11 receives a control signal from the controller 35, and varies the air-fuel ratio alternately to the lean side and the rich side at time intervals $T_1$ and $T_2$. The ratio between $T_1$ and $T_2$ and the period T are stored in advance in the memory in the controller 35. For instance, $T_1 : T_2 = 1 : 1$, $T = 0.1$–$5.0$ sec. It should be noted that the time intervals and the period may be set as $T_3$, $T_4$, and T in accordance with the operating condition of the internal combustion engine 1, as shown in FIG. 11(b).

The introduced air controlled by the controller 11 is supplied to the heater 15, is heated to a predetermined temperature, and is introduced into the exhaust pipe 4 upstream of the catalyst 5 via the check valve 10. In addition, the catalyst heater 34 is energized through control by the controller 35 at the same time as the internal combustion engine 1 is started, so as to heat the catalyst 5. Since an upper limit of the heat resistance temperature of the catalyst 5 is 900° C., if the temperature exceeds that level, the catalyst 5 becomes deteriorated. For this reason, the energization of the catalyst heater 34 is stopped after the lapse of a predetermined time (e.g. 200 sec.). Thus, in embodiment 10, the amount of air introduced is varied at predetermined time intervals, and it is possible to improve the efficiency of purification of the catalyst 5. Moreover, the introduced air and the catalyst 5 are heated, so that the temperatures of the mixed air and the catalyst 5 are increased, thereby making it possible to improve the purification action.

Although, in embodiment 10, the time intervals at which the amount of air introduced is varied are set to be $T_1$ to $T_4$, the time intervals may be set to be $T_5$ to $T_8$, as shown in FIGS. 12 and 13. In addition, as for the portion of the air intake side from which the introduced air is to be introduced or the type of control valve 11 to be adopted, modifications similar to those of embodiment 5 are conceivable.

Embodiment 11

Although, in embodiment 10, the time intervals are varied periodically, an arrangement may be provided such that the amplitude of variation (amount of variation) of the amount of air introduced is made variable, and is set to be an optimum value in accordance with the component, amount, and condition of the catalyst 5 and the operating condition of the engine. In this case, modifications are made in the same way as in embodiment 6, as in FIGS. 11 and 14.

Embodiment 12

Although, in embodiments 10 and 11, the time intervals at which the amount of air introduced is varied or the amount of variation is varied, in embodiment 12, the amount of air introduced by means of the control valve 11 and the time intervals of variation thereof are controlled in accordance with an output of at least one of the output of the exhaust-gas temperature sensor 31 for detecting the temperature of exhaust gases and the output of the catalyst temperature sensor 36 for detecting the temperature of the catalyst 5. As a result, in addition to the above-described advantages, it is possible to prevent the deterioration of the catalyst 5 due to overheating. At the same time, it is possible to effect optimum control of the amount of air introduced in accordance with the operating condition of the engine, and to improve the action of purifying exhaust gases irrespective of the operating condition.

Embodiment 13

In embodiment 13, the amount of air introduced, the time intervals at which it is varied, and the amount of variation are varied in accordance with the operational parameters of the internal combustion engine 1. As a result, it is possible to effect finely-tuned control and to implement purification of exhaust gases in an ideal manner. Since this control is carried out in a manner similar to embodiment 8, a description thereof will be omitted.

Embodiment 14

Although, in embodiment 13, the amount of introduced air to be controlled is varied in accordance with the operational parameters of the engine, the amounts of heat to be imparted to the heaters 15 and 34 may additionally be varied in accordance with the engine parameters. For instance, in FIG. 19, the amount of air introduced $Q_B$ is decreased since the amount of heat generated due to the oxidation reaction in the catalyst 5 in the region of very high revolution becomes excessively large. At that time, an arrangement may be provided such that, as shown in FIG. 22, the amounts of heat in the heaters 15 and 34 are reduced or cut off, and the normal-temperature air is introduced, so as to cool the catalyst 5, or, as shown in FIG. 23, an attempt may be made not to decrease $Q_B$. FIGS. 24 to 29 show examples in which the amount of introduced air heated and the amount of catalyst heated are varied in accordance with the engine parameters.

Embodiment 15

Figure 31:
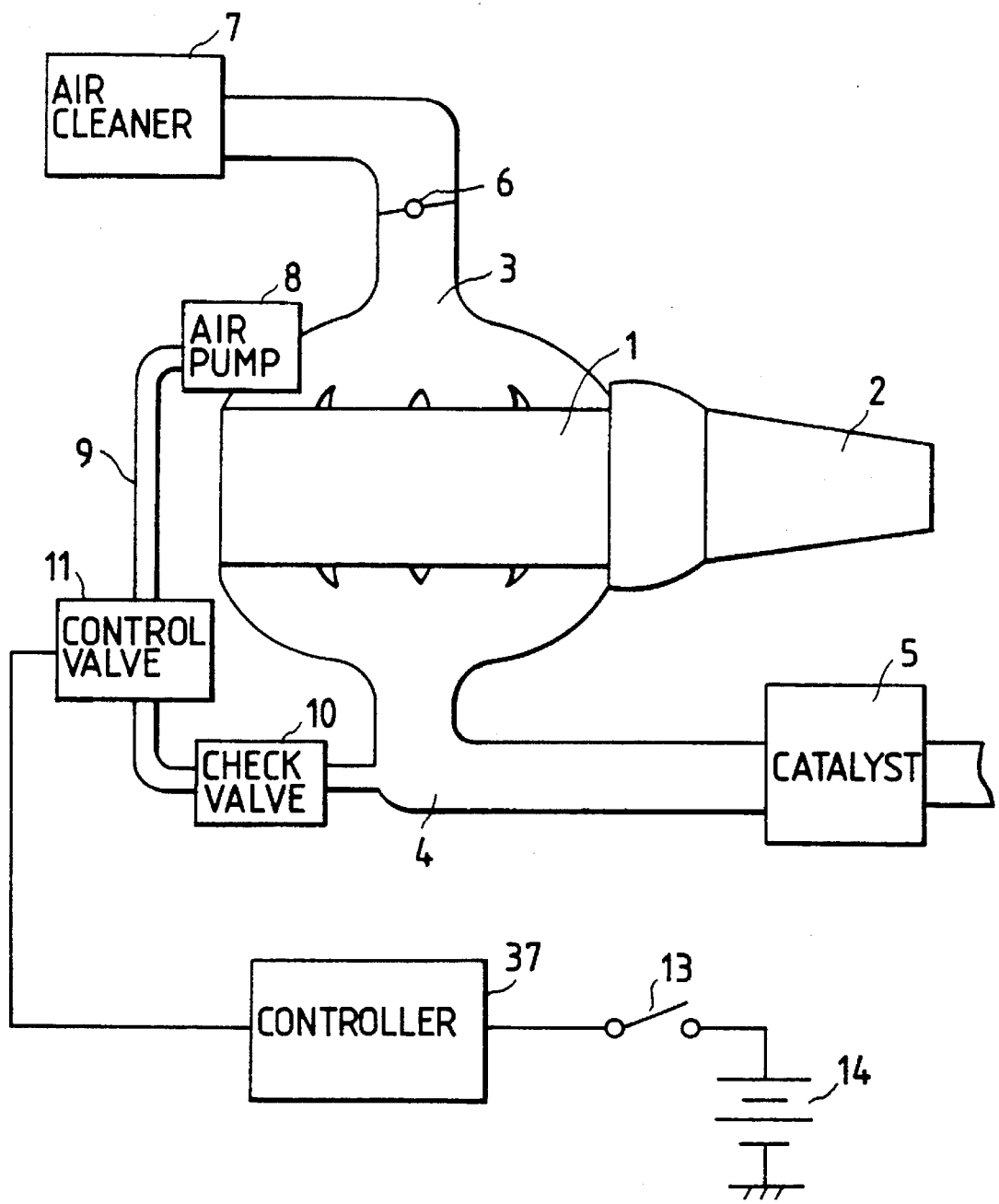
FIG. 31 is a schematic diagram in accordance with embodiment 15 of the apparatus of this invention.

FIG. 31 shows a configuration in accordance with embodiment 15, in which reference numeral 37 denotes a controller for controlling the control valve 11, and the other configuration is the same as described above.

Next, a description will be given of the operation of embodiment 15. The air is introduced into the air introducing pipe 9 through the operation of the air pump 8 at the same time as the internal combustion engine 1 is started. However, the controller 37 does not turn on the control valve 11 for the time duration $S_1$ after the turning on of the starter switch 13, as shown in FIG. 7. For this reason, the amount of air introduced to the exhaust side is zero for the time duration $S_1$. After the elapse of the time duration $S_1$ subsequent to starting, the controller 37 sets the control valve 11 in the open state, and the air introduced from the intake side is supplied to the exhaust pipe 4 via the check valve 10. Accordingly, the temperature of the low-temperature exhaust gases immediately after starting is prevented from becoming lower as a result of mixing in of the low-temperature air from the intake side, and a decline in the purification efficiency of the catalyst is prevented. The time duration $S_1$ assumes a value of several to several dozen seconds. In addition, the amount of air introduced into the exhaust pipe 4 is varied alternately by $Q_2$ and $Q_3$ above or below $Q_1$, which is set as a reference, at predetermined time intervals $T_2$ and $T_3$ by controlling the control valve 11, thereby making it possible to improve the purification efficiency of the catalyst 5.

It should be noted that, in embodiment 15 as well, in a case where the air pump 8 is of an electrically operated type, the above-described controlling operation can be effected by controlling the air pump 8 without providing the control valve 11.

Embodiment 16

Figure 32:
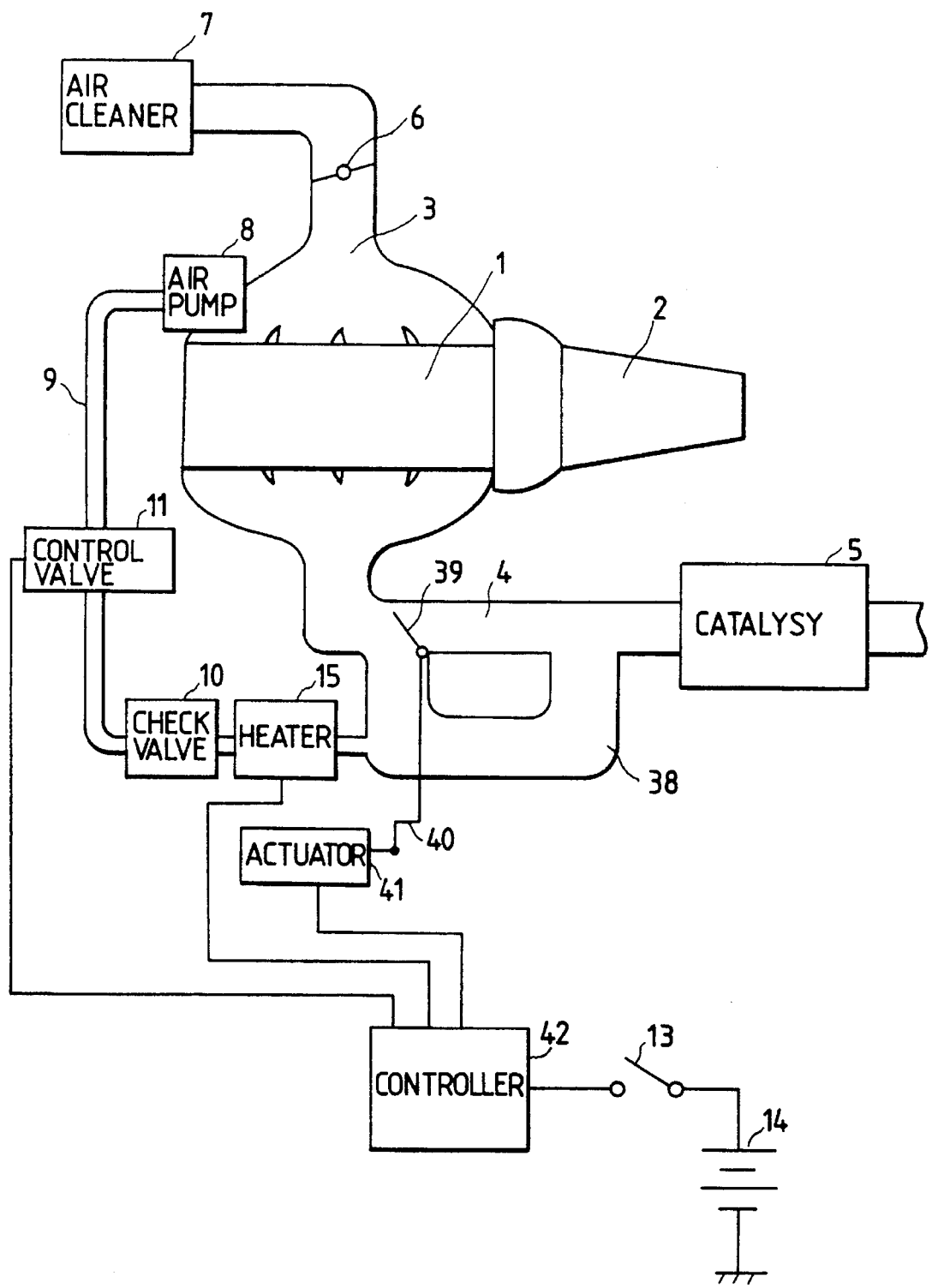
FIG. 32 is a schematic diagram in accordance with embodiment 16 of the apparatus of this invention.

FIG. 32 shows a configuration in accordance with embodiment 16, in which reference numeral 38 denotes an exhaust bypass passage provided in a portion of the exhaust pipe 4 upstream of the catalyst 5, wherein the air introducing pipe 9 whose one end is connected to the intake side has another end connected to this exhaust bypass passage 38. Reference numeral 39 denotes a changeover valve for changing over the flow of exhaust gases emitted from the internal combustion engine 1 between the exhaust pipe 4 side and the exhaust bypass passage 38 side; 40, a link mechanism for the changeover valve 39; 41, an actuator for actuating the changeover valve 39 via the link mechanism 40; and 42, a controller for controlling the heater 15 and the actuator 41.

Figure 33:
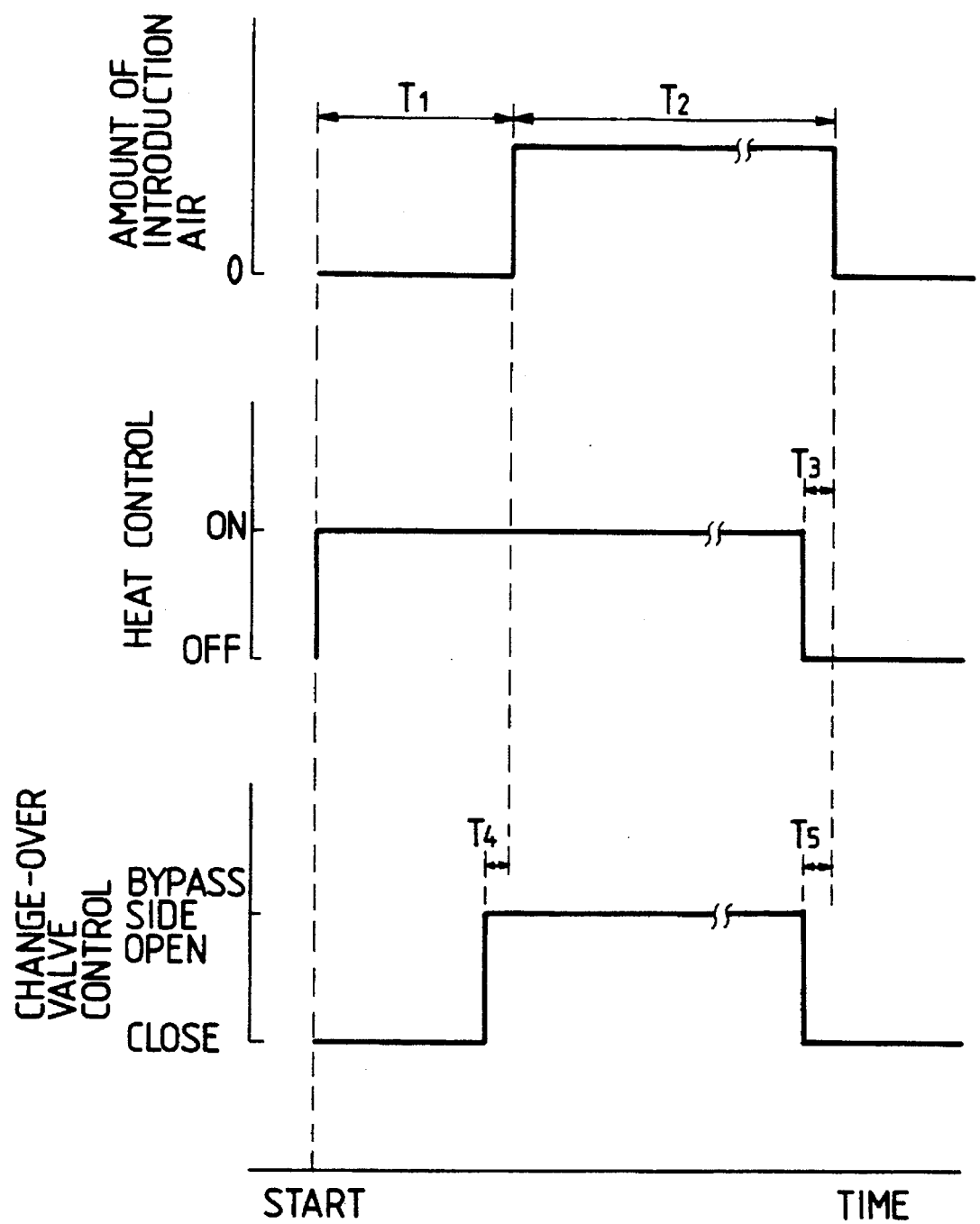
FIG. 33 is a timing chart illustrating the operation in accordance with embodiment 16 of the apparatus of this invention.

Next, a description will be given of the operation of embodiment 16 with reference to FIG. 33. The air is introduced into the air introducing pipe 9 by means of the air pump 8 at the same time as the internal combustion engine 1 is started. The controller 42 detects starting through the operation of the starter switch 13, and operates the heater 15. In a short time, the changeover valve 39 is operated on the basis of a command from the controller 42 via the actuator 41 and the link mechanism 40, and is changed over in such a manner as to allow the exhaust gases to flow to the exhaust bypass passage 38. After the time duration $T_4$ subsequent to the operation of this changeover valve 39, i.e., after the time duration $T_1$ subsequent to starting, the controller 42 opens the control valve 11, so that air passes through the check valve 10, is heated by the heater 15, and is introduced to the exhaust bypass passage 38. After the control valve 11 is opened for the time duration $T_2$, the control valve 11 is closed again.

As a result, the exhaust gases are mixed with the heated air, and the HC and CO components are efficiently purified in the exhaust bypass passage 38 and the catalyst 5. In addition, the energization of the heater 15 is stopped before the time duration $T_3$ prior to the closing of the control valve 11, whereas the changeover valve 39 is operated and is changed over before the time duration $T_5$ prior to the closing of the control valve 11 in such a manner as to allow the exhaust gases to flow to the exhaust pipe 4. Accordingly, while the air is not being introduced, the exhaust gases do not flow through the exhaust bypass passage, so that the effect of the heat of the exhaust gases upon the heater 15 and the like is alleviated. In addition, since the introduction of air is not effected for a predetermined time duration after starting, a decline does not occur in the purification efficiency due to the decline in the catalyst temperature immediately after starting.

It should be noted that in a case where the air pump 8 is of an electrically operated type, the air introduction control can be effected by means of the air pump 8 even if the control valve 11 is not provided. In addition, although the changeover valve 39 is disposed on the inlet side of the exhaust bypass passage 38, the changeover valve 39 may be disposed on the outlet side thereof.

Embodiment 17

Figure 34:
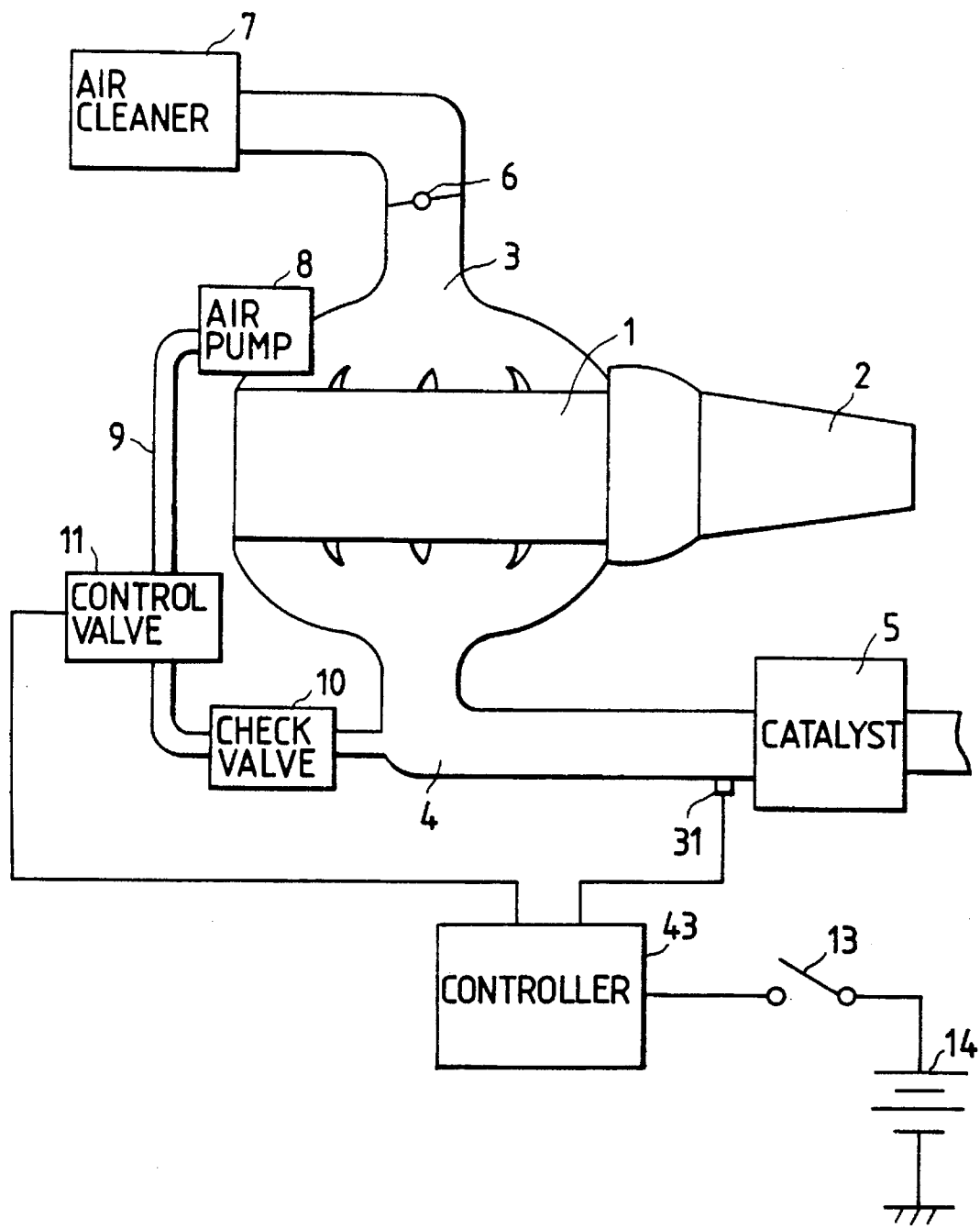
FIG. 34 is a schematic diagram in accordance with embodiment 17 of the apparatus of this invention.

FIG. 34 shows a configuration in accordance with embodiment 17, in which reference numeral 43 denotes a controller for controlling the control valve 11 upon receipt of signals from the exhaust-gas temperature sensor 31 and the starter switch 13. The other configuration is the same as described above.

Next, a description will be given of the operation of embodiment 17. Exhaust gases pass through the exhaust pipe 4 and the catalyst 5 at the same time as the internal combustion engine 1 is started. The exhaust-gas temperature sensor disposed in the vicinity of an inlet of the catalyst 5 detects the temperature of the exhaust gases, and delivers an output shown at a in FIG. 35(a) to the controller 43. At this time, the exhaust gas temperature at an outlet of the catalyst 5 is shown at b in FIG. 35(a). Upon receipt of the on signal from the starter switch 13, the controller 43 integrates the output of the exhaust-gas temperature sensor 31 as shown in FIG. 35(b), detects the heat capacity imparted to the catalyst 5, and determines the degree of activity of the catalyst 5. When the integrated value becomes α, the controller 43 opens the control valve 11, and introduces the air from the intake side into the exhaust pipe 4, as shown in FIG. 35(c). The predetermined value α is set in advance in correspondence with the catalyst 5. Thus, in embodiment 17, the heat capacity imparted to the catalyst 5 is detected, the degree of activity of the catalyst 5 is determined from this heat capacity, and the introduction of air is effected after the degree of activity reaches the predetermined value, thereby making it possible to improve the purification efficiency of the catalyst 5.

Although, in embodiment 17, the heat capacity imparted to the catalyst 5 is detected from the exhaust gas temperature, the heat capacity may be detected from the amount of intake into or exhaust from the engine and the exhaust gas temperature. In addition, in the case where the air pump 8 is of an electrically operated type, the air introduction control may be effected by controlling the air pump 8 without providing the control valve 11.

Embodiment 18

Figure 36:
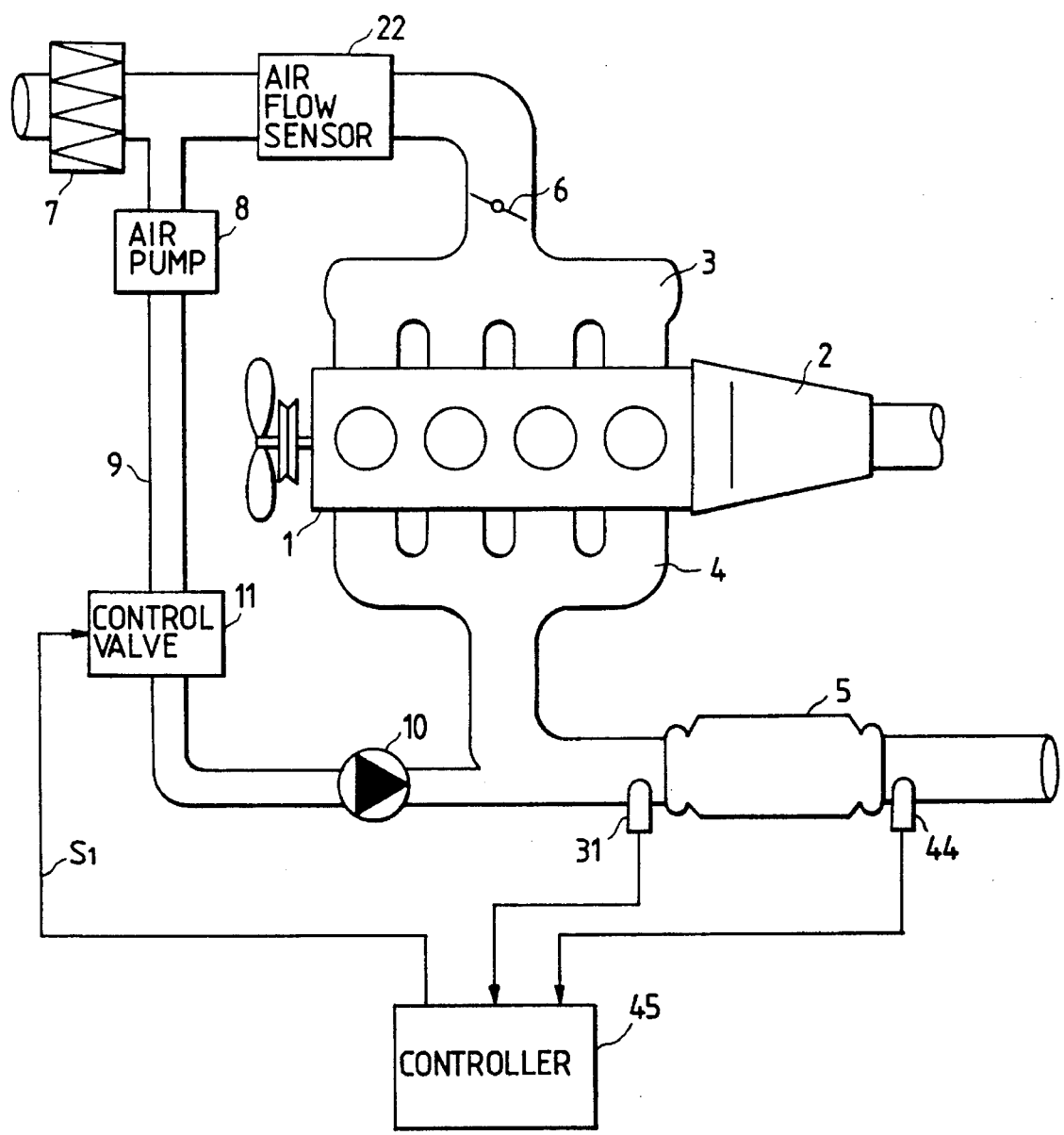
FIG. 36 is a schematic diagram in accordance with embodiment 18 of the apparatus of this invention.

FIG. 36 shows a configuration in accordance with embodiment 18, in which reference numeral 8 denotes the air pump driven by the rotation of the internal combustion engine 1; 11, the control valve for duty control using an electromagnetic solenoid; 31, the exhaust-gas temperature sensor for detecting the temperature of the exhaust gases at the inlet of the catalyst 5; 44, an exhaust-gas temperature sensor for detecting the temperature of the exhaust gas at the outlet of the catalyst 5; and 45, a controller for receiving outputs from the exhaust-gas temperature sensors 31 and 44 and sending a control signal $S_1$ to the control valve 11.

Figure 37:
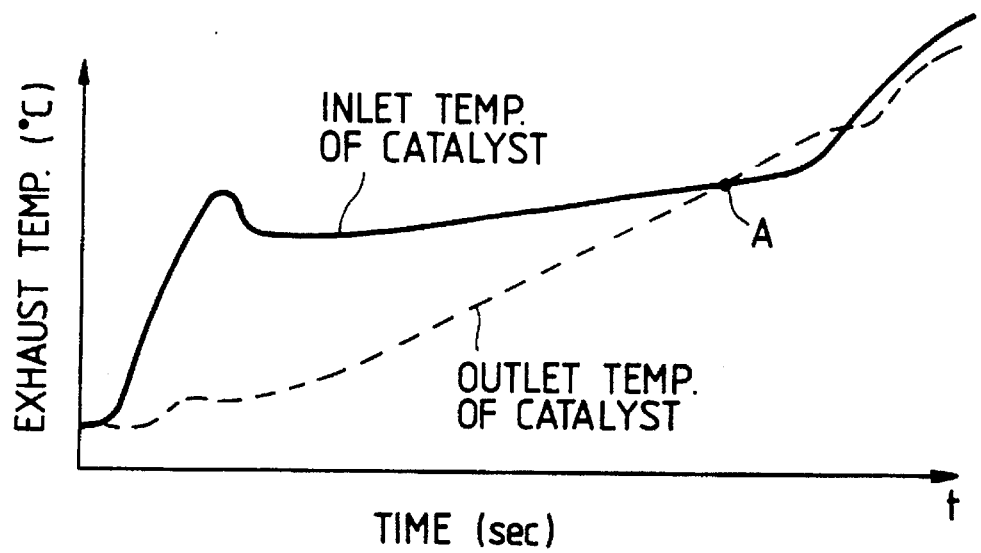
FIG. 37 is a diagram of an output of the exhaust-gas temperature sensor in accordance with embodiment 18 of the apparatus of this invention.
Figure 38:
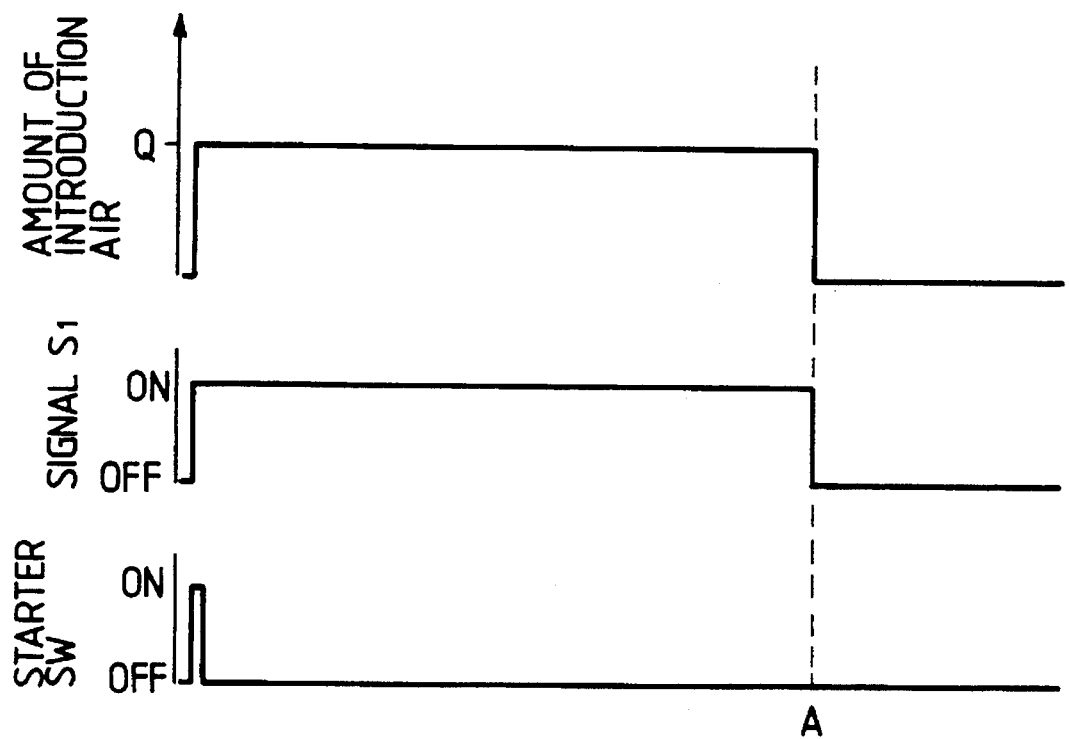
FIG. 38 is a timing chart illustrating the operation in accordance with embodiment 18 of the apparatus of this invention.

Next, a description will be given of the operation of embodiment 18. FIG. 37 shows changes in the temperature at the inlet and outlet of the catalyst 5 when the engine is accelerated after starting and steady running is effected, wherein the solid line indicates the inlet temperature, while the dotted line shows the outlet temperature, a point of intersection of the two lines being A. In addition, FIG. 38 shows the amount of air introduced, the control signal $S_1$, and the operation of the starter switch.

The air which has passed through the air cleaner 7 is sucked by means of the air pump 8, and is supplied to the control valve 11. At the same time as the starter switch is turned on, the control valve 11 receives the control signal $S_1$ from the controller 45 and is thereby set in the open state, so that the introduction of air into the exhaust pipe 4 is started. As for the amount of air introduced Q, a fixed amount is introduced in accordance with the operating condition of the engine, as shown in FIG. 38(a). It should be noted that the amount of air introduced may be changed at predetermined time intervals.

At this time, the introduced air is introduced into the exhaust pipe 4 via the check valve 10, is mixed with the exhaust gases emitted from the internal combustion engine 1, is sent to the catalyst 5, and undergoes oxidation and reduction reaction to generate heat in the catalyst 5. As a result, the temperature of the catalyst 5 increases, and the exhaust gas temperature at the outlet side thereof increases over the exhaust gas temperature at the inlet side thereof. Namely, the temperature of the exhaust gases before and after the catalyst 5 increases with a tendency such as the one shown in FIG. 37. Accordingly, both the inlet temperature and the outlet temperature are detected by the exhaust-gas temperature sensors 31 and 44, the detected values are sent to the controller 45, and the controller 45 compares the two detected values. When the detected values agree with each other (at point A) or when the temperature difference becomes a predetermined value or less, a determination is made that the catalyst 5 has been set in an activated state, so that the control valve 11 is set in the closed state to stop the introduction of air. As a result, the temperature rise after activation of the catalyst 5 is promoted, thereby making it possible to further improve the purification efficiency and to reduce the amount of emission of the nitrogen oxides.

Although, in embodiment 18, the introduction of air is controlled by controlling the control valve 11, in a case where the air pump 8 is of a turbo type or a stroke type which incorporates a DC motor and is driven by a DC power supply, the air introduction control can be effected by controlling the air pump 8.

Embodiment 19

Figure 39:
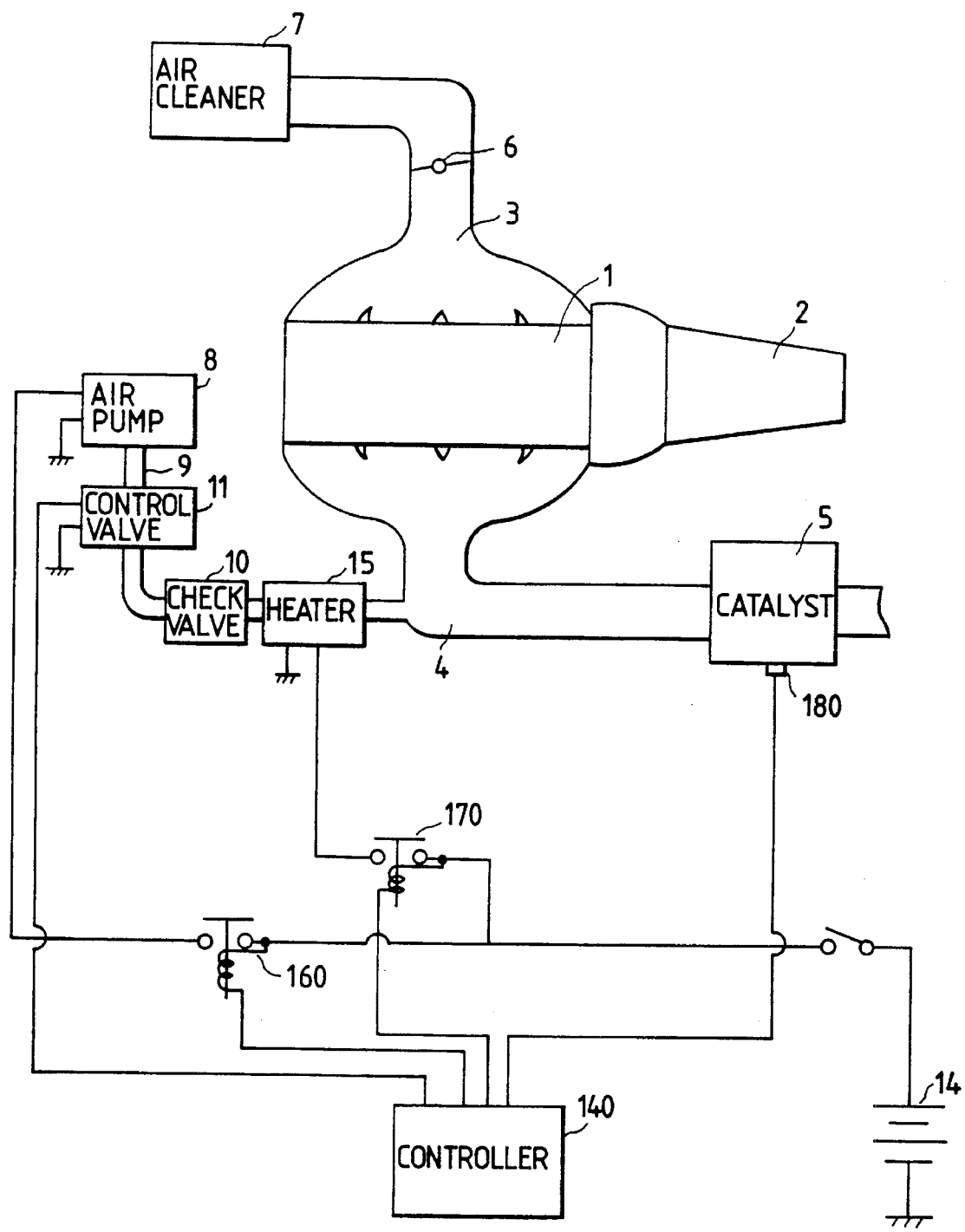
FIG. 39 is a schematic diagram of an apparatus for controlling the introduction of air into an exhaust pipe of an internal combustion engine in accordance with an embodiment 19 of this invention.

FIG. 39 shows an embodiment of this invention, in which reference numeral 180 denotes a temperature detector for detecting the temperature of the catalyst.

A description will be given of the operation of this invention with respect to the embodiment shown in FIG. 39. At the same time as the starting of the internal combustion engine or after a predetermined time duration subsequent to starting, the air pump is operated by a controller 140 and discharges air. At this time, the controller 140 outputs an air pump control output in such a manner as to cause the air pump 8 to discharge a maximum amount of air.

In addition, in order for the controller 140 to deliver an output for operating a heater relay 170 at the same time as the starting of the engine, an electric current is supplied to a heater 15 via the heater relay 170.

Subsequently, when the temperature of the catalyst is detected by the temperature detector 180 and a predetermined temperature is reached, the controller 140 changes the state for controlling the operation of the air pump 8 from the state in which the air pump 8 discharges the maximum amount of air to control in which the air pump 8 discharges a predetermined amount of air necessary for the catalyst.

Figure 40:
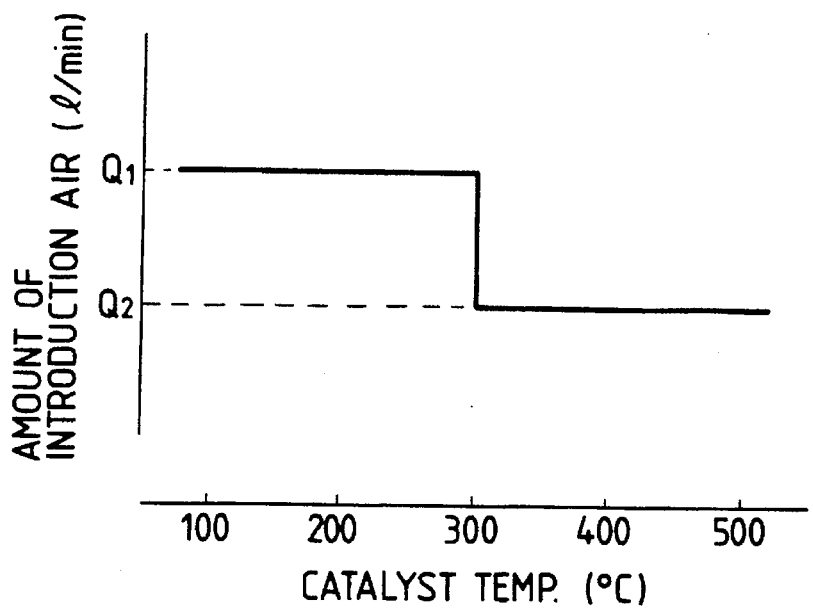
FIG. 40 is a diagram of the relationship between the amount of air introduced and the catalyst temperature in accordance with the embodiment 19 of this invention.

Furthermore, FIG. 40 is a diagram illustrating an amount of air to be changed in accordance with the catalyst temperature. The arrangement provided is such that up to $T_1$ from the starting of the engine, the aforementioned amount of air ($Q_1$ l/min in FIG. 40) is introduced, and after $T_1$ a predetermined amount of air ($Q_2$ l/min in FIG. 40) necessary for the catalyst is introduced.

Figure 41:
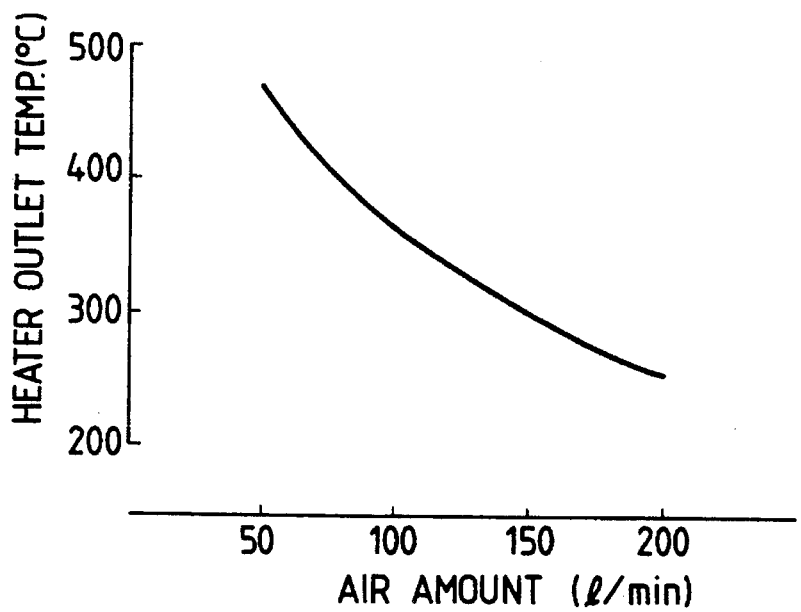
FIG. 41 is a diagram of the relationship between the amount of air introduced into the heater and the outlet temperature in accordance with the embodiment 19 of this invention.

The amount of heat which can be imparted to the catalyst through the control of the aforementioned air pump and heater is shown in FIG. 41. As a characteristic of the heater, there is a tendency that the temperature of the air outputted from heaters, in which the capacities of the heaters and the electric power imparted to the heaters are identical, is proportional to an increase in the flow rate, and the temperature does not drop. As a result, the amount of heat obtained from a heater can be expressed by the following formula:

amount of heat=flow rate×(heater outlet temperature −heater inlet temperature)

Figure 42:
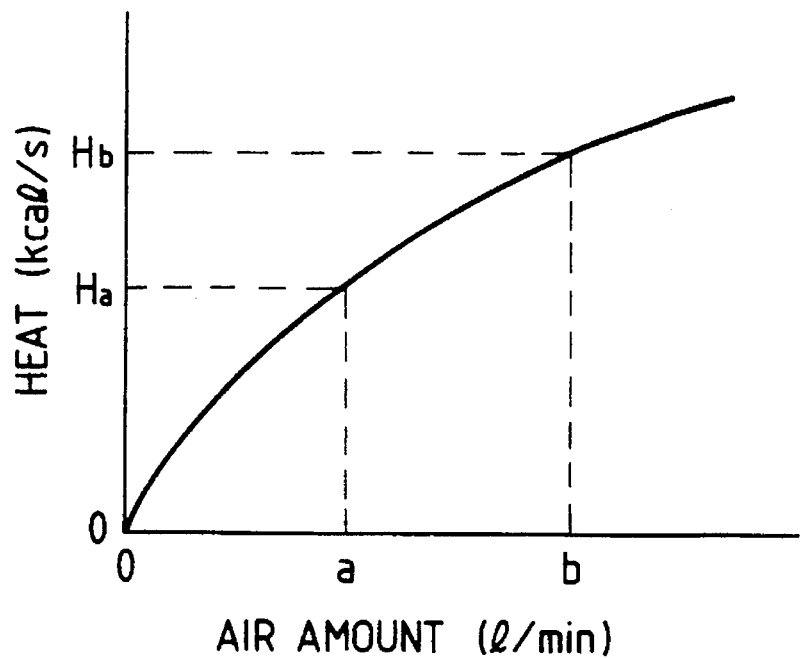
FIG. 42 is a diagram of the relationship between the amount of air introduced and the amount of heat in accordance with the embodiment 19 of this invention.

As shown in FIG. 42, the amount of heat (Ha) when the flow rate is a shows an amount of heat obtainable from a heater in a conventional apparatus, while the amount of heat (Hb) when the flow rate is b shows an amount of heat obtainable from this invention.

As described above, the amount of air introduced into the heater is increased after the starting of the engine, and the amount of air is changed to an amount necessary for the reaction of the catalyst when the catalyst temperature reaches a predetermined temperature, whereby it becomes possible to increase the amount of heat which can be imparted to the catalyst, thereby making it possible to accelerate an increase in the catalyst temperature and improve the efficiency of purification of the exhaust gases.

Embodiment 20

Although in the above-described embodiment the temperature detector is disposed in the catalyst to detect the temperature of the catalyst, a similar effect is obtained if the temperature detector detects the exhaust gas temperature at the catalyst outlet or in the exhaust pipe downstream of the catalyst.

Embodiment 21

Although in the above-embodiments the temperature of the catalyst or the exhaust gas temperature downstream of the catalyst is detected, a point of time for changing over the flow rate may be effected in terms of time after the starting of the engine or after the air is begun to be introduced to the heater, in which case a similar effect is obtained.

Embodiment 22

Although in the above-described embodiments control is provided such that the amount of air introduced is changed suddenly in terms of the temperature of the catalyst, the exhaust gas temperature, or the time after starting, a similar effect is obtained if the flow rate is changed in steps in predetermined ranges of the temperature of the catalyst, the exhaust gas temperature, and the time after starting.

Figure 43:
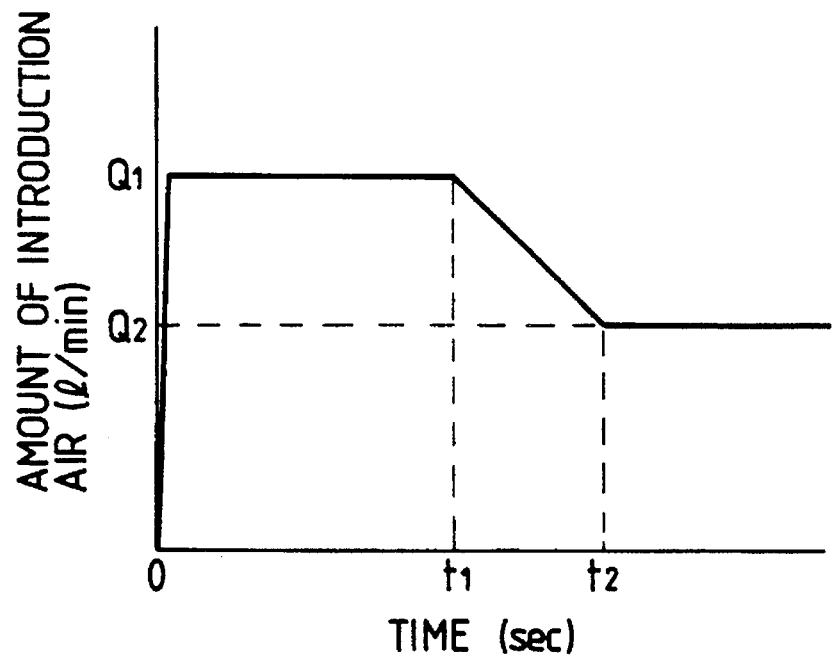
FIG. 43 is a timing chart for changing over the amount of air in accordance with the embodiment 22 of this invention.

Hereafter, a description will be given of the embodiments with reference to FIG. 43. This drawing is a timing chart on the amount of air in a case where the air is introduced to the heater from the starting of the engine, and the amount of air introduced after a predetermined time duration is changed over.

Next, a description will be given of the operation. Since the period from $t_1$ to $t_2$ is a period when the activity of the catalyst has not been fully activated, this period shows a state in which the amount of air is gradually changed with the lapse of time. In addition, during the period up to $t_1$ from the starting of the engine and the period subsequent to $t_2$, control is effected to introduce the amount of air in the same way as in embodiments 1 and 2 in which the catalyst temperature is detected or the exhaust gas temperature is detected.

In addition, it goes without saying that in the detection of the catalyst temperature and the detection of the exhaust gas temperature as well, the detection is realized by providing control in which the flow rate is introduced in accordance with the temperature within a predetermined temperature range.

Embodiment 23

Figure 44:
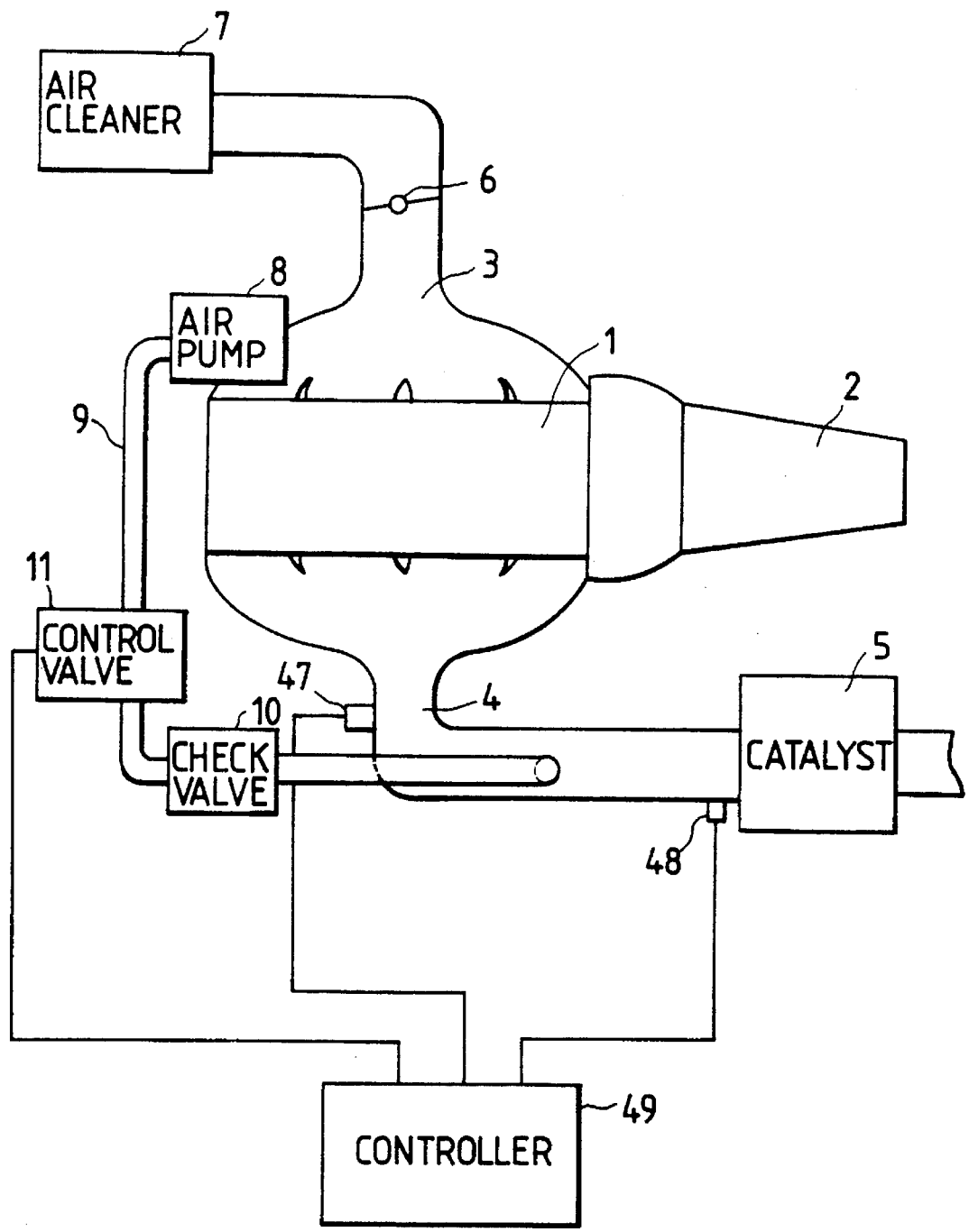
FIG. 44 is a schematic diagram in accordance with embodiment 23 of the apparatus of this invention.

FIG. 44 shows a configuration in accordance with embodiment 23, in which reference numeral 47 denotes an air-fuel ratio sensor disposed in a portion of the exhaust pipe 4 upstream of a connecting portion of the air introducing pipe 9 and for detecting the air-fuel ratio of the exhaust gases; 48, an oxygen sensor disposed in the vicinity of the inlet or outlet of the catalyst 5 in the exhaust pipe 4 and for detecting the oxygen concentration in the exhaust pipe 4; and 49, a controller to which outputs of the air-fuel ratio sensor 47 and the oxygen sensor 48 are inputted so as to effect fuel control and to control the control valve 11.

Next, a description will be given of the operation of embodiment 23. Starting is effected in the cool state of the internal combustion engine 1, and during warming-up, the air-fuel ratio sensor 47 detects the air-fuel ratio from the exhaust gases in the exhaust pipe 4 in several dozen seconds after starting. In addition, at the same time as starting, the air pump 8 introduces air via the air introducing pipe 9. The controller 49 calculates an amount of oxygen necessary for reaction in the catalyst 5 on the basis of an oxygen concentration signal from the oxygen sensor 48, controls the control valve 11 correspondingly, and allows the introduced air to be introduced into the exhaust pipe 4 so that the necessary amount of oxygen can be obtained. Furthermore, the controller 49 calculates an appropriate amount of fuel in correspondence with the output from the air-fuel ratio sensor 47, and controls an unillustrated injector correspondingly, thereby effecting fuel control.

Although, in embodiment 23, a mechanical air pump 8 which is driven by the rotation of the internal combustion engine 1 is used, it is possible to use an electrically operated one, in which case the control valve 11 may be omitted. In addition, although the fuel control and the introduced-airamount control are effected by the identical controller 49, these two types of control may be effected by separate controllers.

Embodiment 24

Figure 45:
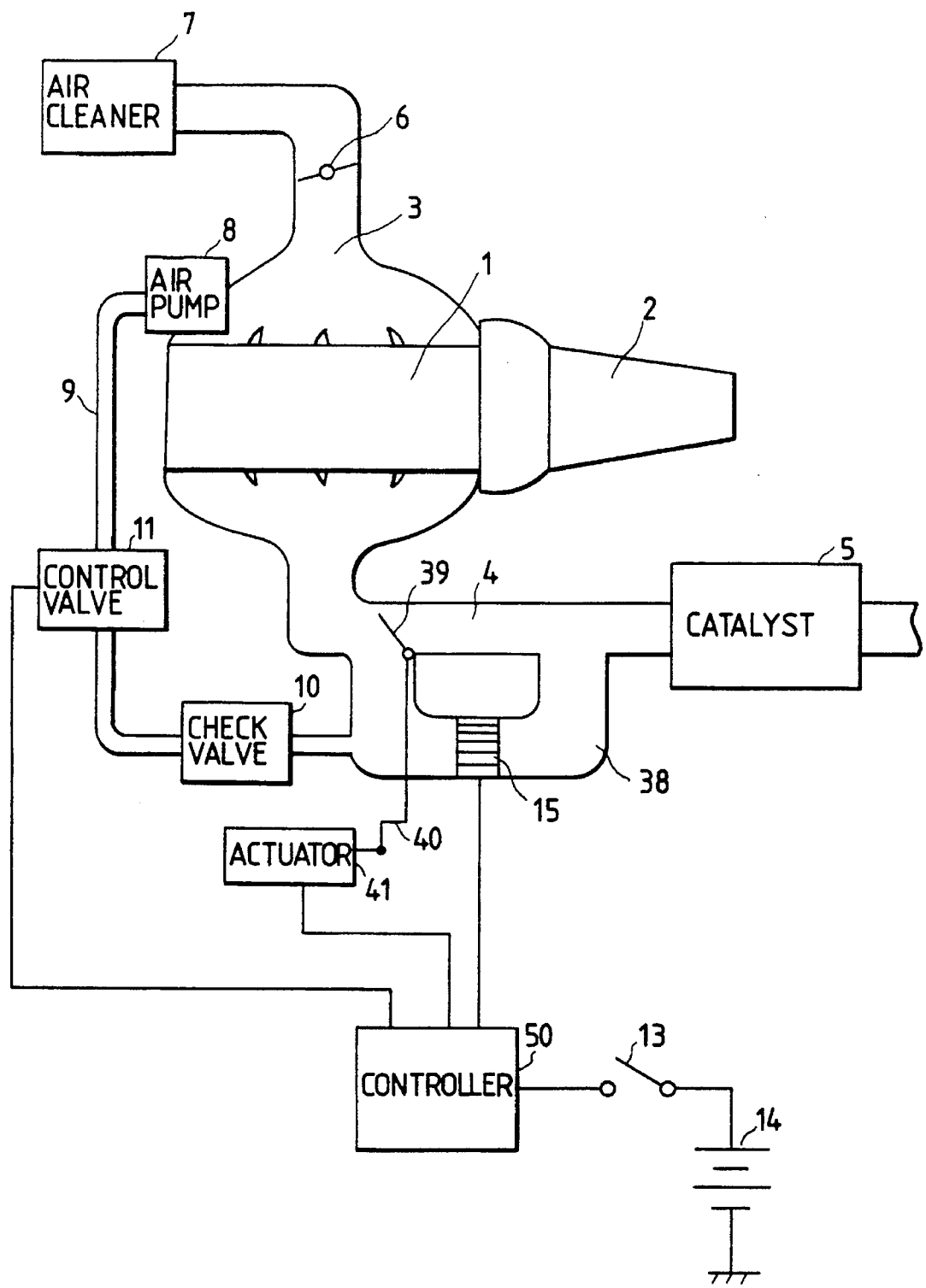
FIG. 45 is a schematic diagram in accordance with embodiment 24 of the apparatus of this invention.
Figure 46:
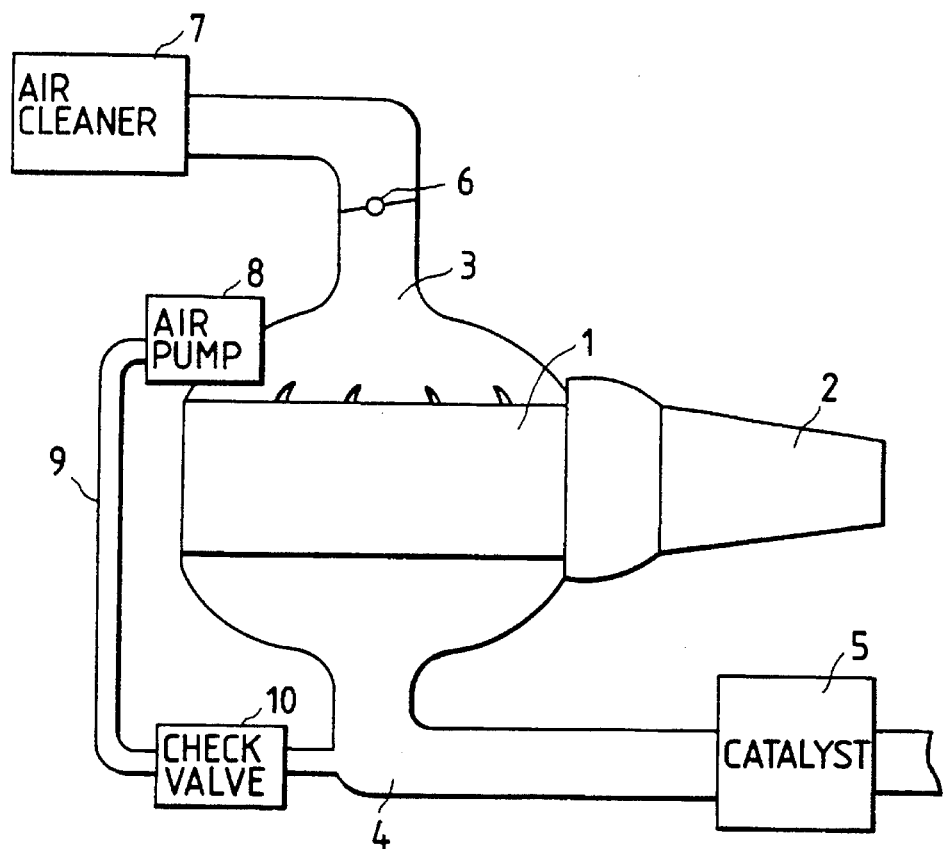
FIG. 46 is a schematic diagram of a conventional apparatus.
Figure 47:
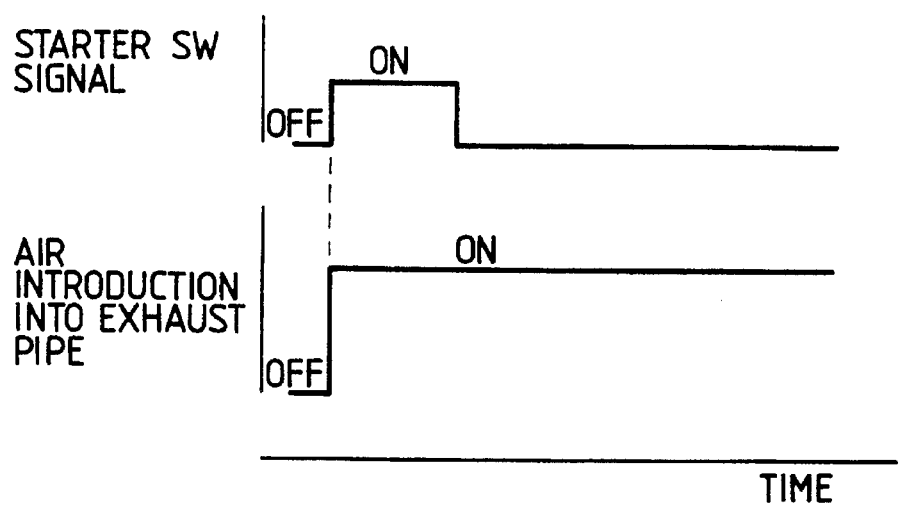
FIG. 47 is a timing chart illustrating the operation of a first conventional apparatus.
Figure 48:
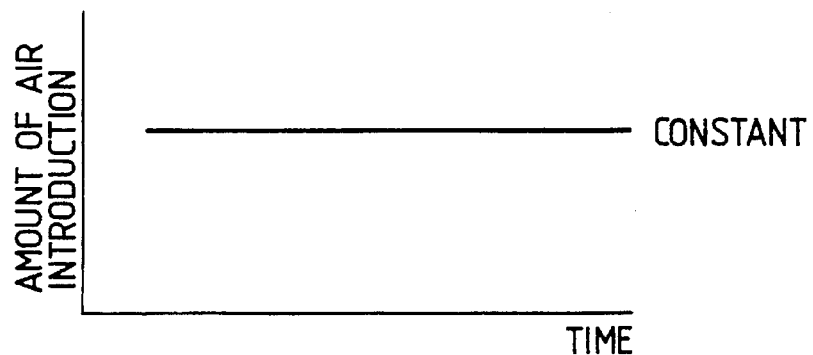
FIG. 48 is a timing chart of the amount of air introduced in the first conventional apparatus.
Figure 49:
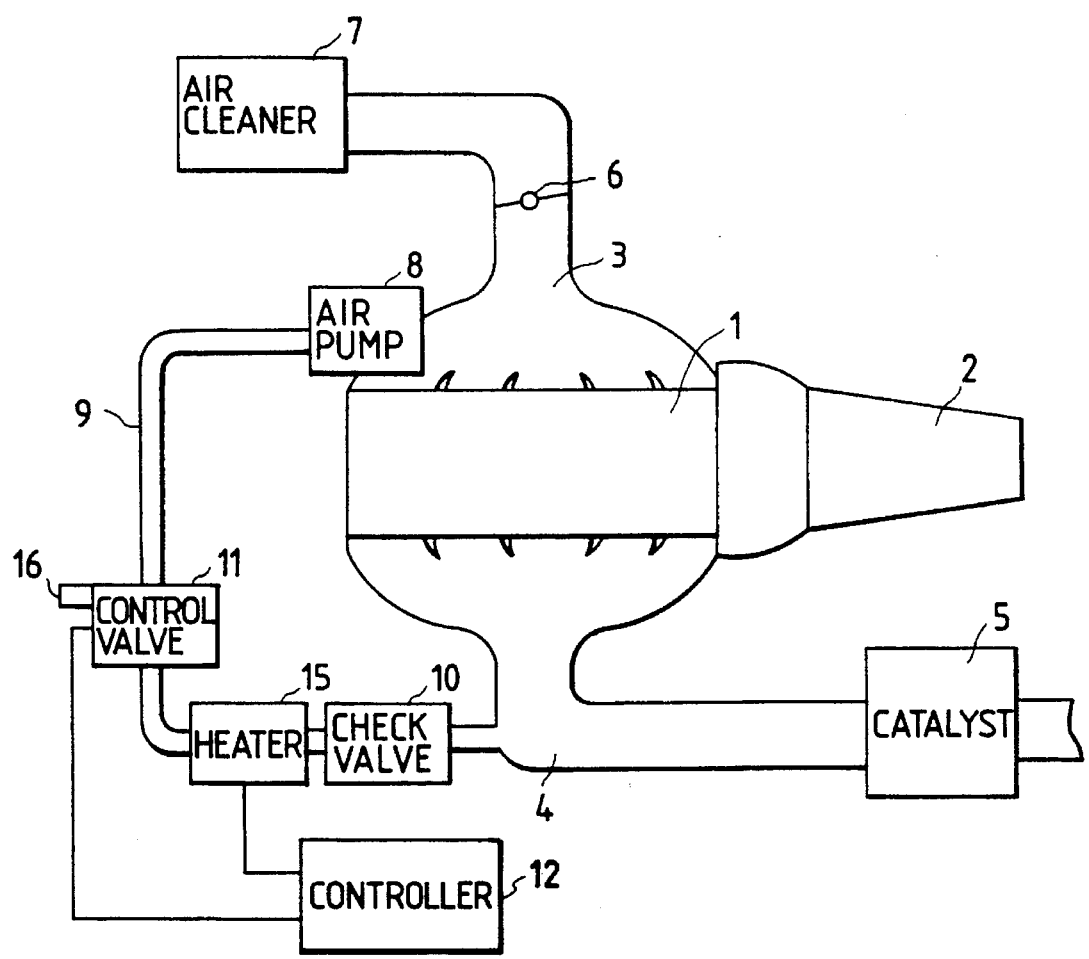
FIG. 49 is a schematic diagram of a second conventional apparatus.
Figure 50:
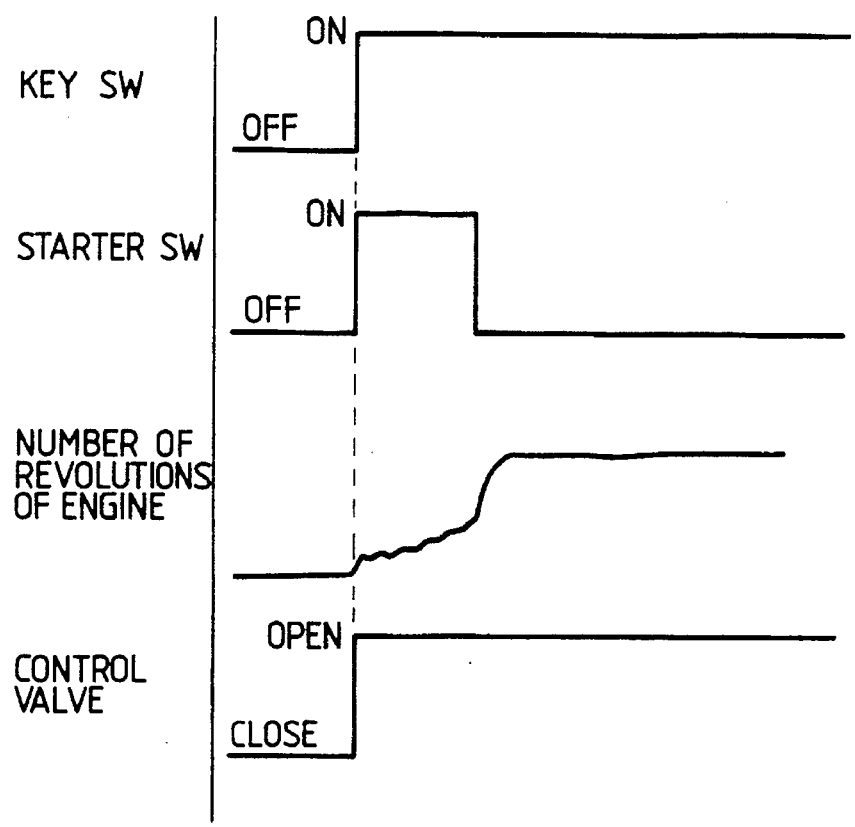
FIG. 50 is a timing chart illustrating the operation of the second conventional apparatus.
Figure 51:
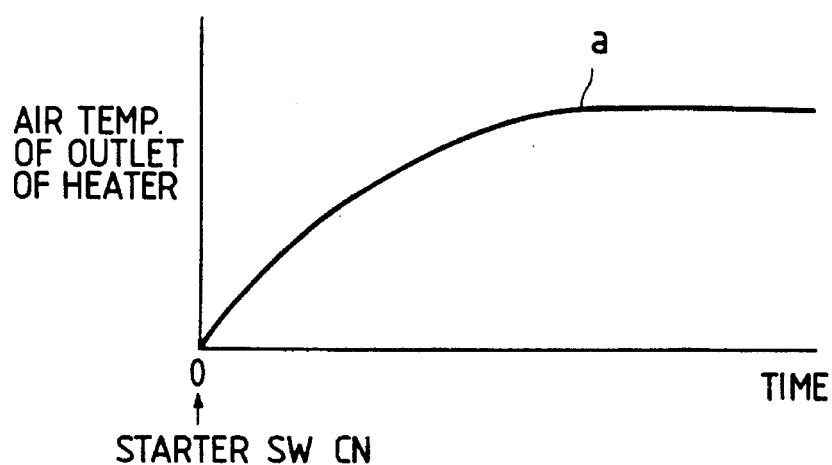
FIG. 51 is a diagram of fluctuations of an outlet temperature of a heater in the second conventional apparatus.
Figure 52:
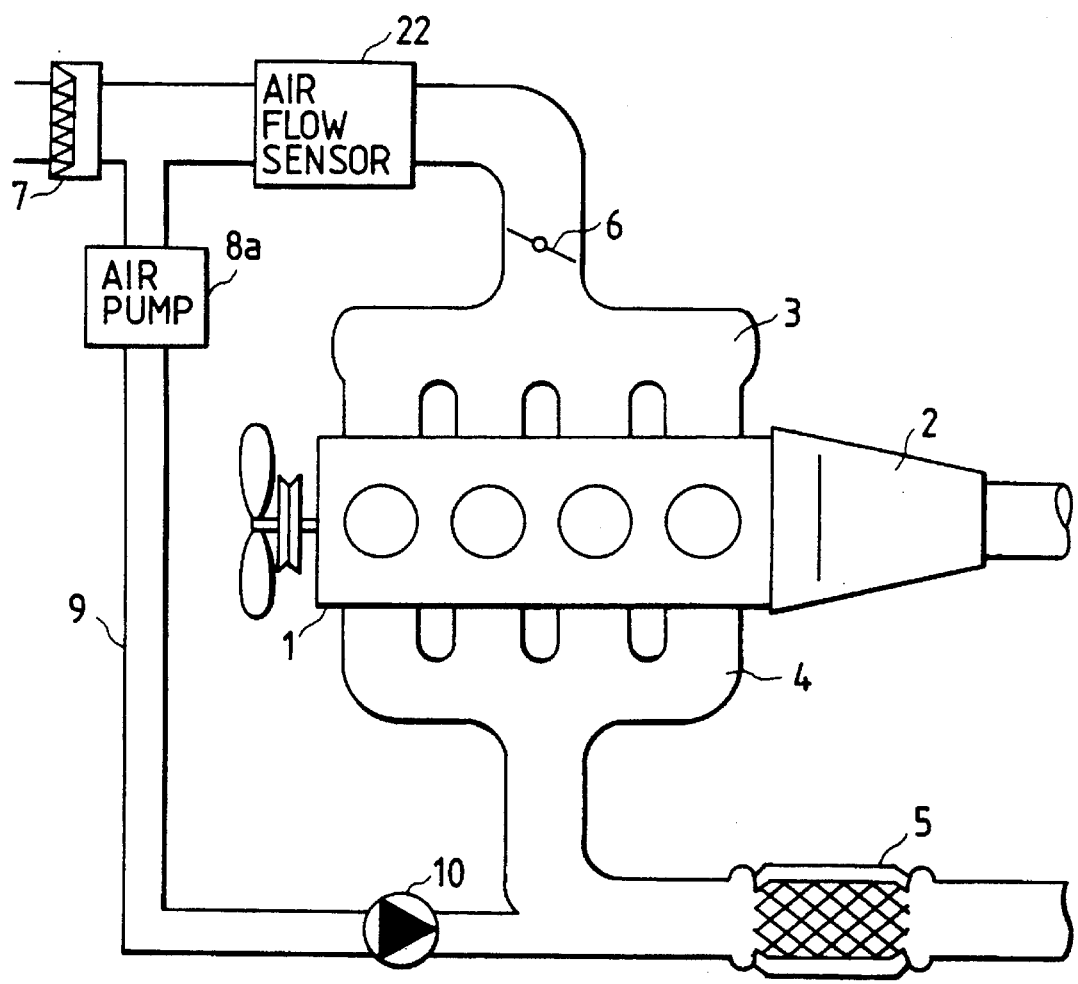
FIG. 52 is a schematic diagram of a third conventional apparatus.
Figure 53:
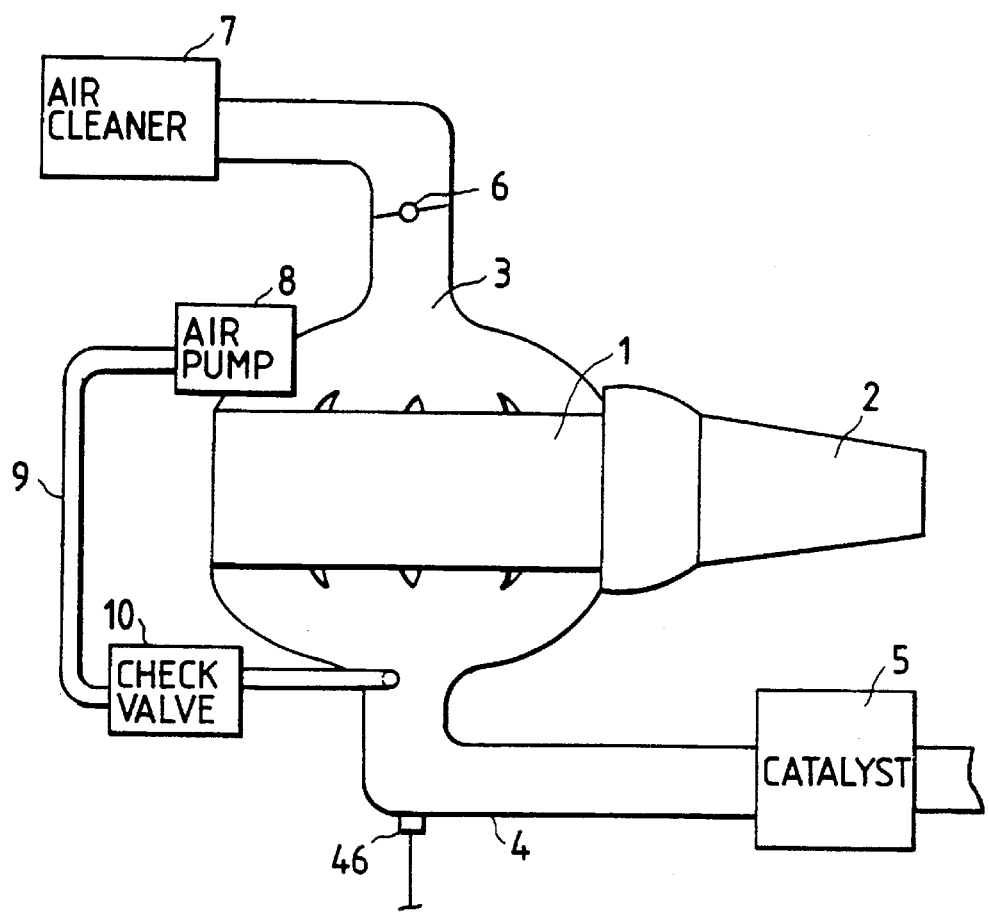
FIG. 53 is a schematic diagram of a fourth conventional apparatus.
Figure 54:
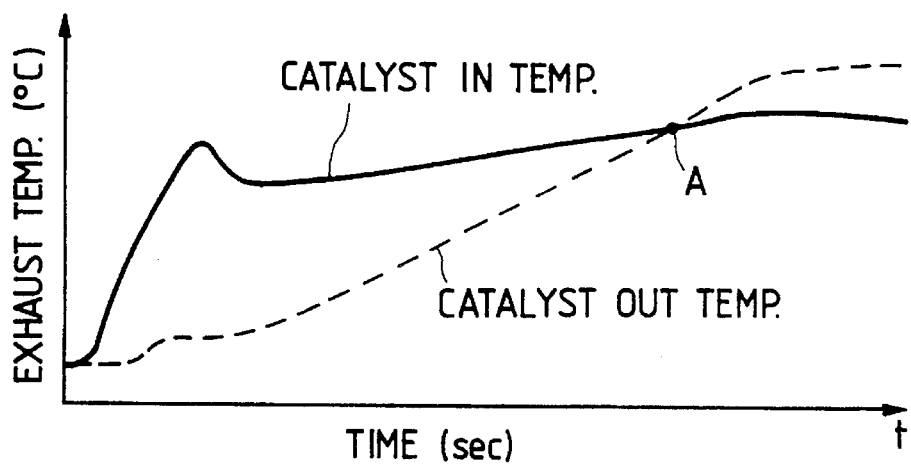
FIG. 54 is a diagram of an output of the exhaust-gas temperature sensor of a conventional apparatus.

FIG. 45 shows a configuration in accordance with embodiment 24, in which reference numeral 50 denotes a controller for controlling the heater 15, the control valve 11, and the actuator 41, the heater 15 being disposed in the exhaust bypass passage 38. The other configuration is the same as FIG. 32.

Next, a description will be given of the operation of embodiment 24. At the same time as the internal combustion engine 1 is started, air is introduced into the exhaust bypass passage 38 via the air introducing pipe 9, the control valve 11, and the check valve 10 through the operation of the air pump 8. In addition, as the starter switch 13 is turned on, the controller 50 controls the control valve 11, the heater 15, and the actuator 41, and the air introduced into the exhaust bypass passage 38 is heated by the heater 15. Meanwhile, the changeover valve 39 is set in the illustrated state by the actuator 41 via the link mechanism 41, and the exhaust gases emitted from the internal combustion engine 1 are not introduced to the exhaust pipe 4 and are introduced to the exhaust bypass passage 38, are mixed with the introduced air, and is heated by the heater 15, so that the HC and CO components contained in the exhaust gases are purified in the exhaust bypass passage 38 and the catalyst 5. On the other hand, when the control valve 11 is closed by the controller 50, the introduction of air to the exhaust side is stopped, and the changeover valve 39 is changed over in such a manner as to allow the exhaust gases to flow through the exhaust pipe 4. Accordingly, since the exhaust gases flow through the exhaust-gas bypass passage 38 only when they are necessary, the effect of the heat of the exhaust gases on the heater 15 and the air introducing pipe 9 can be alleviated.

Although, in embodiment 24, a mechanical air pump 8 is used, an electrically operated type may be alternatively used.

As described above, in accordance with the invention, air to be introduced into the exhaust pipe is not introduced during engine starting or during starting and a predetermined time duration after starting, so that it is possible to prevent a decline in the purification efficiency of the catalyst in a state in which the exhaust gas temperature immediately after starting is low.

In addition, in accordance with the invention, since the introduction of air into the exhaust pipe is delayed until the outlet temperature of the heater increases, the temperature of the air introduced to the exhaust pipe can be set to a predetermined temperature, and it is possible to improve the efficiency of purifying the exhaust gases.

In addition, in accordance with the invention, since heated air is introduced into the exhaust pipe after a predetermined time duration subsequent to engine starting, it is possible to prevent a situation in which the exhaust gas temperature drops due to the introduction of normal-temperature (unheated) air immediately after starting and the purification efficiency of the catalyst declines. Furthermore, the amount of air introduced is varied at predetermined time intervals, so that the purification efficiency of the catalyst can be fully exhibited by changing the atmosphere in the reaction system of the catalyst to the rich and the lean sides.

In addition, in accordance with the invention, since the exhaust gases and the air introduced from the intake side are heated, it is possible to increase the temperature of the exhaust gases, thereby making it possible to improve the purification efficiency of the catalyst.

In addition, in accordance with the invention, since the heating means in the exhaust pipe is operated even after the engine stop, it is possible to burn the soot adhering to the interior when the exhaust gases do not flow, thereby making it possible to maintain the flow of exhaust gases in a satisfactory manner.

In accordance with the invention, by heating the air to be introduced into the exhaust pipe, the chemical reaction is accelerated, and by periodically changing the amount of air introduced, the purification efficiency of the exhaust gases can be improved.

In accordance with the invention, the time intervals at which the amount of air introduced is varied, the amount of variation, and the amount of introduced air heated by the heating means are varied in accordance with the operating condition of the engine, so that the purification efficiency of the catalyst can be controlled optimally.

In accordance with the invention, since the introduced air and the catalyst are heated, the oxidation reaction in the catalyst is accelerated, and the purification efficiency improves. Furthermore, the amount of air introduced is increased or decreased at predetermined time intervals, thereby making it possible to improve the purification efficiency.

In accordance with the invention, the amount of air heated and time intervals of variation thereof are controlled in accordance with either the exhaust gas temperature or the catalyst temperature, thereby making it possible to prevent the deterioration due to the overheating of the catalyst. At the same time, it is possible to optimally introduce the air in accordance with the operating condition of the engine, and the action of purifying the exhaust gases is promoted irrespective of the operating condition.

In accordance with this invention, the arrangement provided is such that the heated air is introduced in a greater amount to the upstream of the catalyst from the starting of the engine up to the activation of the catalyst, and the amount of air heated and introduced is changed to an amount optimally suited for the reaction of the catalyst is introduced in accordance with the activation of the catalyst. Accordingly, it is possible to obtain activation and promotion of the catalyst, and it is possible to obtain a large improvement in the efficiency of purification of HC and CO which are the exhaust gas components.

Furthermore, since it becomes possible to introduce an optimum amount of air in correspondence with the activation of the catalyst, it is possible to suppress the amount of NOx emitted due to the oversupply state of air to a minimum.

In accordance with the invention, the introduction of air from the intake side to the exhaust side is not effected for a predetermined time duration subsequent to starting, so that it is possible to prevent a decline in the purification efficiency due to a drop in the catalyst temperature. In addition, since the amount of air introduced is periodically varied, it is possible to enhance the purification efficiency of the catalyst. In accordance with the invention, since the introduction of air is started after a predetermined time duration subsequent to engine starting, it is possible to prevent a decline in the purification efficiency due to a drop in the catalyst temperature. In addition, since the amount of air introduced is periodically varied, it is possible to enhance the action of purifying the exhaust gases.

In accordance with the invention, since the exhaust gases are allowed to flow to the exhaust-gas bypass passage only during the introduction of air, it is possible to alleviate the effect of the heat of the exhaust gases upon the heater and the like disposed in the air introducing pipe connected to the exhaust bypass passage. Hence, the life of the heater and the like is prolonged, and it is possible to maintain high purification efficiency. In accordance with embodiment 3, since the introduction of air is not effected immediately after starting, it is possible to prevent a decline in the purification efficiency due to a drop in the catalyst temperature.

In accordance with the invention, the degree of activity of the catalyst is detected by detecting the heat capacity of the catalyst, and the introduction of air is effected when this o degree of activity reaches a predetermined value, thereby making it possible to improve the purification efficiency of the catalyst.

In accordance with the invention, the temperatures of exhaust gases before and after the catalyst are detected, and when the two temperatures have agreed with each other or have fallen within a predetermined range of values, a determination is made that the catalyst has been set in an activated state, so that air is not introduced into the exhaust pipe. Hence, it is possible to improve the purification efficiency after the activation of the catalyst, and it is possible to reduce the amount of nitrogen oxides emitted.

In accordance with the invention, since the air-fuel ratio sensor is disposed in the exhaust pipe upstream of a connecting portion of the air introducing pipe, it is possible to detecting the air-fuel ratio of the exhaust gases alone, and it is possible to accurately effect fuel control during the introduction of air. In addition, since an amount of oxygen necessary for the catalyst is detected by the oxygen sensor, and air is introduced correspondingly, it is possible to improve the purification efficiency.

In accordance with the invention, the exhaust bypass passage is provided for the exhaust pipe, and the exhaust gases are introduced to the exhaust bypass passage only when the air is introduced to the exhaust side, it is possible to mitigate the effect of the heat of the exhaust gases to the heater disposed in the exhaust pipe and the air introducing pipe connected to the exhaust pipe. Hence, it is possible to prolong the life of these components, and it is possible to maintain high purification efficiency.

In accordance with the invention, since the amount of air introduced is varied periodically and up to its magnitude, it is possible to improve the efficiency of purifying the exhaust gases.

In accordance with the invention, the introduction of air is not carried out for a predetermined time duration immediately after starting, so that it is possible to prevent a decline in the purification efficiency due to a drop in the catalyst temperature. In addition, since the exhaust gases are allowed to flow to the exhaust bypass passage only during the introduction of air to the exhaust side, it is possible to eliminate the effect of the heat of exhaust gases.

What is claimed is:

1. An apparatus for controlling the introduction of air into an exhaust pipe of an internal combustion engine, comprising:

means for introducing air into said exhaust pipe of said internal combustion engine upstream of a catalyst via an air introducing pipe;

air heating means for heating the air introduced into said air introducing pipe;

catalyst heating means for heating the catalyst; and controlling means for varying an amount of air introduced into said exhaust pipe at a predetermined time interval.

2. The controlling apparatus as claimed in claim 1, further comprising an exhaust-gas temperature sensor for detecting the temperature of exhaust gases and a catalyst temperature sensor for detecting the temperature of the catalyst, wherein the amount of air introduced and the time interval of variation thereof are controlled in accordance with one of the exhaust gas temperature and the catalyst temperature.

3. The controlling apparatus as claimed in claim 1, wherein at least one of a time interval at which the amount of air introduced into said exhaust pipe is varied, an amount of variation, an amount of air heated, and an amount of catalyst heated is varied in accordance with an operational parameter of said engine.

* * * * *